US 6,654,825 B2

(12) United States Patent
Clapp et al.

(10) Patent No.: US 6,654,825 B2
(45) Date of Patent: *Nov. 25, 2003

(54) PERIPHERAL VIDEO CONFERENCING SYSTEM WITH CONTROL UNIT FOR ADJUSTING THE TRANSMISSION BANDWIDTH OF THE COMMUNICATION CHANNEL

(75) Inventors: Doug Clapp, Edina, MN (US); David Mulder, St. Louis Park, MN (US)

(73) Assignee: RSI Systems, Inc., Edina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/027,660

(22) Filed: Dec. 19, 2001

(65) Prior Publication Data

US 2002/0087761 A1 Jul. 4, 2002

Related U.S. Application Data

(63) Continuation of application No. 09/561,159, filed on Apr. 28, 2000, which is a continuation of application No. 09/019,114, filed on Feb. 5, 1998, now Pat. No. 6,073,192, which is a continuation of application No. 08/302,108, filed on Sep. 7, 1994, now Pat. No. 5,802,281.

(51) Int. Cl.[7] .............................. G06F 3/00; G06F 3/02; G06F 13/12; H04N 7/14
(52) U.S. Cl. ............................. 710/60; 710/62; 710/65; 710/69; 348/15; 348/552
(58) Field of Search ............................. 710/60, 62, 65, 710/69; 348/15, 552, 554; 370/260

(56) References Cited

U.S. PATENT DOCUMENTS

| 4,004,084 A | 1/1977 | Brown et al. |
| 4,258,357 A | 3/1981 | Browell |
| 4,258,387 A | 3/1981 | Lemelson et al. |
| 4,430,526 A | 2/1984 | Brown et al. |
| 4,449,144 A | 5/1984 | Suzuki |
| 4,460,918 A | 7/1984 | Flasza |
| 4,485,400 A | 11/1984 | Lemelson et al. |
| 4,493,021 A | 1/1985 | Agrawal et al. |
| 4,499,568 A | 2/1985 | Gremillet |
| 4,531,024 A | 7/1985 | Colton et al. |
| 4,710,813 A | 12/1987 | Wallis et al. |
| 4,710,917 A | 12/1987 | Tompkins et al. |
| 4,785,472 A | 11/1988 | Shapiro |
| 4,796,833 A | 1/1989 | Pinson |
| 4,797,750 A | 1/1989 | Karweit |
| 4,805,205 A | 2/1989 | Faye |

(List continued on next page.)

OTHER PUBLICATIONS

Article by Satoshi Ishibashi and Hiroaki Fujimoto; "New Videoconferencing Systems," Nov. 5, 1993; pp. 51–53.

(List continued on next page.)

Primary Examiner—Thomas Lee
Assistant Examiner—Chun Cao
(74) Attorney, Agent, or Firm—Merchant & Gould P.C.

(57) ABSTRACT

A peripheral video conferencing system is housed in a peripheral housing and adapted for communication with an analog or digital communication channel and a separate host computer system. Audio, video, and data file information is transmitted to and received from a remote conferencing site over the communication channel. A plurality of audio, video, and communication channel connectors provide means for acquiring source audio and video signals, and respectively displaying on a separate monitor and broadcasting over an internal or separate external speaker remote video images and audio. A high-speed output interface provides connectivity with the separate host computer system for coordinating, in cooperation with video conferencing application software operating thereon, the presentation of local and remote NTSC or PAL video images on a display coupled to the computer system.

41 Claims, 12 Drawing Sheets

U.S. PATENT DOCUMENTS

| | | |
|---|---|---|
| 4,847,829 A | 7/1989 | Tompkins et al. |
| 4,878,242 A | 10/1989 | Springer et al. |
| 4,893,326 A | 1/1990 | Duran et al. |
| 4,928,300 A | 5/1990 | Ogawa et al. |
| 4,931,872 A | 6/1990 | Stoddard et al. |
| 4,932,047 A | 6/1990 | Emmons et al. |
| 4,949,169 A | 8/1990 | Lumelsky et al. |
| 4,992,866 A | 2/1991 | Morgan |
| 5,014,267 A | 5/1991 | Tompkins et al. |
| 5,025,314 A | 6/1991 | Tang et al. |
| 5,027,198 A | 6/1991 | Yoshioka |
| 5,038,224 A | 8/1991 | Martulli et al. |
| 5,061,992 A | 10/1991 | Ueno |
| 5,062,136 A | 10/1991 | Gattis et al. |
| 5,117,372 A | 5/1992 | Petty |
| 5,134,611 A | 7/1992 | Steinka et al. |
| 5,142,361 A | 8/1992 | Tayama et al. |
| 5,142,562 A | 8/1992 | Guichard et al. |
| 5,164,980 A | 11/1992 | Bush et al. |
| 5,191,601 A | 3/1993 | Ida et al. |
| 5,192,999 A | 3/1993 | Graczyk et al. |
| 5,202,961 A | 4/1993 | Mills et al. |
| 5,204,768 A | 4/1993 | Tsakiris et al. |
| 5,206,721 A | 4/1993 | Ashida et al. |
| 5,226,117 A | 7/1993 | Miklos |
| 5,230,063 A | 7/1993 | Hoeber et al. |
| 5,257,306 A | 10/1993 | Watanabe |
| D341,848 S | 11/1993 | Bigelow et al. |
| 5,280,275 A | 1/1994 | Kaplan |
| 5,280,540 A | 1/1994 | Addeo et al. |
| 5,283,638 A | 2/1994 | Engberg et al. |
| 5,283,819 A | 2/1994 | Glick et al. |
| 5,287,448 A | 2/1994 | Nicol et al. |
| 5,309,509 A | 5/1994 | Cocklin et al. |
| 5,315,633 A | 5/1994 | Champa |
| 5,317,405 A | 5/1994 | Kuriki et al. |
| 5,318,257 A | 6/1994 | Tani |
| 5,323,445 A | 6/1994 | Nakatsuka |
| 5,325,194 A | 6/1994 | Natori et al. |
| 5,343,240 A | 8/1994 | Yu |
| 5,347,305 A | 9/1994 | Bush et al. |
| 5,351,076 A | 9/1994 | Hata et al. |
| 5,357,281 A | 10/1994 | Ikeda et al. |
| 5,367,331 A | 11/1994 | Secher et al. |
| 5,369,617 A | 11/1994 | Munson |
| 5,371,534 A | 12/1994 | Dagdeviren et al. |
| 5,373,316 A | 12/1994 | Ishinabe et al. |
| 5,374,952 A | 12/1994 | Flohr et al. |
| 5,375,068 A | 12/1994 | Palmer et al. |
| 5,382,972 A | 1/1995 | Kannes |
| 5,384,588 A | 1/1995 | Martin et al. |
| 5,392,284 A | 2/1995 | Sugiyama |
| 5,396,269 A | 3/1995 | Gotoh et al. |
| 5,397,133 A | 3/1995 | Penzias |
| 5,400,068 A | 3/1995 | Ishida et al. |
| 5,400,069 A | 3/1995 | Braun et al. |
| 5,402,418 A | 3/1995 | Shibata et al. |
| 5,408,261 A | 4/1995 | Kamata et al. |
| 5,412,418 A | 5/1995 | Nishimura et al. |
| 5,418,560 A | 5/1995 | Yasuda |
| 5,430,473 A | 7/1995 | Beecher, II et al. |
| 5,432,900 A | 7/1995 | Rhodes et al. |
| 5,434,913 A | 7/1995 | Tung et al. |
| 5,444,476 A | 8/1995 | Conway |
| 5,444,477 A | 8/1995 | Yamadera et al. |
| 5,446,491 A | 8/1995 | Shibata et al. |
| 5,448,285 A | 9/1995 | Kadowaki |
| 5,453,792 A | 9/1995 | Gifford et al. |
| 5,473,366 A | 12/1995 | Imaeda et al. |
| 5,473,367 A | 12/1995 | Bales et al. |
| 5,477,546 A | 12/1995 | Shibata et al. |
| 5,479,405 A | 12/1995 | Koz et al. |
| 5,483,530 A | 1/1996 | Davis et al. |
| 5,490,247 A | 2/1996 | Tung et al. |
| 5,491,797 A | 2/1996 | Thompson et al. |
| 5,495,485 A | 2/1996 | Hughes-Hartogs |
| 5,506,954 A | 4/1996 | Arshi et al. |
| 5,510,829 A | 4/1996 | Sugiyama et al. |
| 5,512,938 A | 4/1996 | Ohno |
| D370,010 S | 5/1996 | Clapp et al. |
| 5,515,099 A | 5/1996 | Cortjens et al. |
| 5,515,296 A | 5/1996 | Agarwal et al. |
| 5,515,423 A | 5/1996 | Beck et al. |
| 5,524,110 A | 6/1996 | Danneels et al. |
| 5,526,037 A | 6/1996 | Cortjens et al. |
| 5,532,940 A | 7/1996 | Agarwal et al. |
| 5,534,914 A | 7/1996 | Flohr et al. |
| 5,535,138 A | 7/1996 | Keith |
| 5,539,452 A | 7/1996 | Bush et al. |
| 5,541,639 A | 7/1996 | Takatsuki et al. |
| 5,546,324 A | 8/1996 | Palmer et al. |
| 5,550,649 A | 8/1996 | Wong et al. |
| 5,550,754 A | 8/1996 | McNelley et al. |
| 5,572,248 A | 11/1996 | Allen et al. |
| 5,579,301 A | 11/1996 | Ganson et al. |
| 5,583,565 A | 12/1996 | Cortjens et al. |
| 5,585,839 A | 12/1996 | Ishida et al. |
| 5,587,735 A | 12/1996 | Ishida et al. |
| 5,587,928 A | 12/1996 | Jones et al. |
| 5,589,873 A | 12/1996 | Natori et al. |
| 5,589,878 A | 12/1996 | Cortjens et al. |
| 5,594,495 A | 1/1997 | Palmer et al. |
| 5,594,725 A | 1/1997 | Tischler et al. |
| 5,594,859 A | 1/1997 | Palmer et al. |
| 5,600,646 A | 2/1997 | Polomski |
| 5,606,554 A | 2/1997 | Shibata et al. |
| 5,608,450 A | 3/1997 | Agarwal et al. |
| 5,608,653 A | 3/1997 | Palmer et al. |
| 5,611,038 A | 3/1997 | Shaw et al. |
| 5,619,528 A | 4/1997 | Rebec et al. |
| 5,627,978 A | 5/1997 | Altom et al. |
| 5,638,114 A | 6/1997 | Hatanaka et al. |
| 5,657,246 A | 8/1997 | Hogan et al. |
| 5,659,692 A | 8/1997 | Poggio et al. |
| 5,675,374 A | 10/1997 | Kohda |
| 5,675,375 A | 10/1997 | Riffee |
| 5,675,511 A | 10/1997 | Prasad et al. |
| 5,675,512 A | 10/1997 | Ireton et al. |
| 5,684,527 A | 11/1997 | Terui et al. |
| 5,689,641 A | 11/1997 | Ludwig et al. |
| 5,717,857 A | 2/1998 | Burkman et al. |
| 5,740,163 A | 4/1998 | Herve |
| 5,764,278 A | 6/1998 | Nagao |
| 5,767,897 A | 6/1998 | Howell |
| 5,784,572 A | 7/1998 | Rostoker et al. |
| 5,790,179 A | 8/1998 | Shibata et al. |
| 5,802,281 A * | 9/1998 | Clapp et al. ................ 709/228 |
| 5,818,513 A | 10/1998 | Sano et al. |
| 5,818,514 A | 10/1998 | Duttweiler et al. |
| 5,821,985 A | 10/1998 | Iizawa |
| 5,835,129 A | 11/1998 | Kumar |
| 5,844,599 A | 12/1998 | Hildin |
| 5,852,466 A | 12/1998 | Komine et al. |
| 5,854,893 A | 12/1998 | Ludwig et al. |
| 5,861,907 A | 1/1999 | Wada |
| 5,862,388 A | 1/1999 | Danneels et al. |
| 5,867,653 A | 2/1999 | Aras et al. |
| 5,872,922 A | 2/1999 | Hogan et al. |
| 5,872,923 A | 2/1999 | Schwartz et al. |
| 5,877,755 A | 3/1999 | Hellhake |
| 5,900,907 A | 5/1999 | Malloy et al. |

| | | |
|---|---|---|
| 5,907,604 A | 5/1999 | Hsu |
| 5,915,091 A | 6/1999 | Ludwig et al. |
| 5,917,543 A | 6/1999 | Uehara |
| 5,926,208 A | 7/1999 | Noonen et al. |
| 5,929,897 A | 7/1999 | Schneider et al. |
| 5,930,473 A | 7/1999 | Teng et al. |
| 5,936,662 A | 8/1999 | Kim et al. |
| 5,936,945 A | 8/1999 | Shibata et al. |
| 5,949,475 A | 9/1999 | Hatanaka et al. |
| 5,953,050 A | 9/1999 | Kamata et al. |
| 5,963,246 A | 10/1999 | Kato |
| 5,983,261 A | 11/1999 | Riddle |
| 5,991,373 A | 11/1999 | Pattison et al. |
| 5,995,490 A | 11/1999 | Shaffer et al. |
| 6,008,838 A | 12/1999 | Iizawa |
| 6,011,579 A | 1/2000 | Newlin |
| 6,025,870 A | 2/2000 | Hardy |
| 6,037,970 A | 3/2000 | Kondo |
| 6,049,694 A | 4/2000 | Kassatly |
| 6,072,522 A | 6/2000 | Ippolito et al. |
| 6,073,192 A * | 6/2000 | Clapp et al. .................. 710/65 |
| 6,078,350 A | 6/2000 | Davis |
| 6,397,275 B1 * | 5/2002 | Clapp et al. .................. 710/60 |

OTHER PUBLICATIONS

Article by Satoshi Ishibashi and Minoru Kobayashi; FM–C100L: A Multimedia Communication Adaptor for LANS; Nov. 5, 1993; pp. 48–50.

Chang, C. & Sheu, B. A Multi–Chip Design for Portable Video Compression Systems, Multi–Chip Module Conference, pp. 39–44, 1993.

* cited by examiner

PERIPHERAL VIDEO CONFERENCING SYSTEM WITH CONTROL UNIT FOR ADJUSTING THE TRANSMISSION BANDWIDTH OF THE COMMUNICATION CHANNEL

This application is a continuation of application Ser. No. 09/561,159, filed Apr. 28, 2000, which is a continuation of Ser. No. 09/019,114, filed Feb. 5, 1998, now U.S. Pat. No. 6,073,192, which is a continuation of Ser. No. 08/302,108, filed on Sep. 7, 1994, now U.S. Pat. No. 5,802,281, which application(s) are incorporated herein by reference.

A portion of the disclosure of this patent document contains material to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

FIELD OF THE INVENTION

The present invention relates generally to video conferencing systems, and, more particularly, to a peripheral video conferencing system adapted for stand-alone use and operation with a separate host computer system.

BACKGROUND OF THE INVENTION

Video teleconferencing systems which employ custom audio and video processing components and proprietary signal processing techniques for effectuating video teleconferencing over a dedicated network link are known. Custom prior art video teleconferencing systems, such as the one illustrated in FIG. 1, typically employ a local video processing system 20 and a remote video processing system 30 that exchange audio and video information over a dedicated or specialized network link 26. Manufacturers of such prior art video processing systems typically utilize custom audio and video components in the design and manufacture of custom audio and video coder and decoder (CODEC) assemblies which generally communicate only with CODEC assemblies produced from the same manufacturer. Utilization of custom CODEC assemblies typically necessitates employment of custom communication interfaces 24 and 34 to interface the custom video processing systems 20 and 30 with the dedicated network link 26.

Employing custom audio and video CODEC assemblies and signal processing techniques in the production of video teleconferencing systems generally results in the manufacture of low-volume, high-cost systems that are typically affordable only to governmental entities and larger corporations. Early custom video processing systems 20 and 30 typically sold for over $100,000 per individual system, with operational costs often exceeding $200 per hour to communicate over a dedicated network link 26.

Recent advances in video teleconferencing technology have resulted in a reduction in the production and procurement costs of video teleconferencing systems. By 1993, two emerging leaders in the video teleconferencing system market, PictureTel and VTel, were marketing systems having an average purchase price of approximately $40,000. These and other prior art video teleconferencing systems, however, continue to employ custom audio/video components and signal processing techniques. The high costs associated with the purchase and operation of prior art video teleconferencing systems and, in particular, the lack of compatibility between dissimilar systems, severely limits the efficacy of video teleconferencing as a communication tool for businesses and individuals.

Desktop video teleconferencing systems have recently been developed to take advantage of the relatively low-cost processing capability of today's personal computer systems. Manufacturers of such desktop video teleconferencing systems generally produce and market a set of video teleconferencing computer cards which, together with the computer system into which the cards are installed, provide desktop video teleconferencing of limited quality and functionality. A video teleconferencing card set adapted for use in a host computer system typically comprises three individual computer cards, each of which must be installed into a corresponding card slot within the computer system chassis. A conventional personal computer system 40 is illustrated in FIG. 2 with its housing cover removed. A typical personal computer system 40 generally includes a power supply 42, one or more hard disk and floppy disk drives 44, internal random access memory, and up to eight card slots, all of which are generally connected to and communicate over a motherboard 51.

A user of a prior art desktop video teleconferencing system must typically disassemble the computer system's housing to gain access to the internal components, install the three video teleconferencing cards into three card slots 46, 48, and 50, modify the settings of various configuration switches on the motherboard 51, reassemble the computer system's housing cover and base, and then reconfigure the operating system software of the computer system 40 to acknowledge and communicate with the newly installed video teleconferencing card set. Although the cost of prior art desktop video teleconferencing systems are comparatively lower in cost than the video processing systems 20 and 30 previously discussed, such desktop systems continue to be prohibitively expensive to many businesses and the individual consumer. More significantly, a potential purchaser of a prior art desktop video teleconferencing system may be unable or unwilling to dedicate up to three internal card slots 46, 48, and 50 for the installation of the video teleconferencing cards. Moreover, the typically complex task of re-configuring both. the hardware and the software of the personal computer system 40 after installation of the video teleconferencing card set to facilitate desktop video teleconferencing may well deter a user from investing in such a cumbersome system.

The conventional video teleconferencing systems illustrated in FIGS. 1 and 2 fail to provide a high degree of portability from one conferencing site to another. The system shown in FIG. 1 is usually permanently installed in dedicated local and remote conferencing rooms, where parties must convene in order to participate in a video teleconference. Access to the dedicated network link 26 is generally available only at the permanent conferencing sites, thus precluding the ability to move the video teleconferencing systems 20 and 30 to other desired conferencing sites.

Transporting the prior art desktop video teleconferencing system illustrated in FIG. 2 to a new conferencing site is similarly impractical. The desktop computer system 40, keyboard, monitor, cables, and any other attached peripheral devices must be disconnect, transported, then reconnected at the new conferencing site. Although transporting a prior art desktop video teleconferencing system 40 and associated hardware can be accomplished through great effort, such systems generally require a dedicated network link typically unavailable at other desirable conferencing sites. Further, use of custom audio/video components and signal processing techniques continues to severely limit the portability of prior art desktop video teleconferencing systems.

There is a desire among the manufacturers and users of video teleconferencing systems to minimize the complexity of installing, configuring, and operating a video teleconferencing system. There exists a further desire to enhance the portability of a video teleconferencing system to facilitate easy transport of the system to a plurality of conferencing sites. Additionally, there continues to exist in the video teleconferencing equipment manufacturing community a keenly felt need to provide full-color, full-motion video teleconferencing systems which can communicate in conformance with internationally recognized communication standards, and be purchased at a relatively low cost. The present invention fulfills these and other needs.

SUMMARY OF THE INVENTION

The present invention is a peripheral audio/visual communication system that communicates with analog and digital communication channels for transmitting video, audio, and other information acquired from a local conferencing site, and receiving audio and video information from a remote conferencing site. The invention also comprises a high-speed interface for communicating with a separate host computer system and includes visual conferencing application software to enhance the functionality of the audio/visual communication system.

DETAILED DESCRIPTION OF THE PREFERRED EMBODIMENTS

Figure 3:
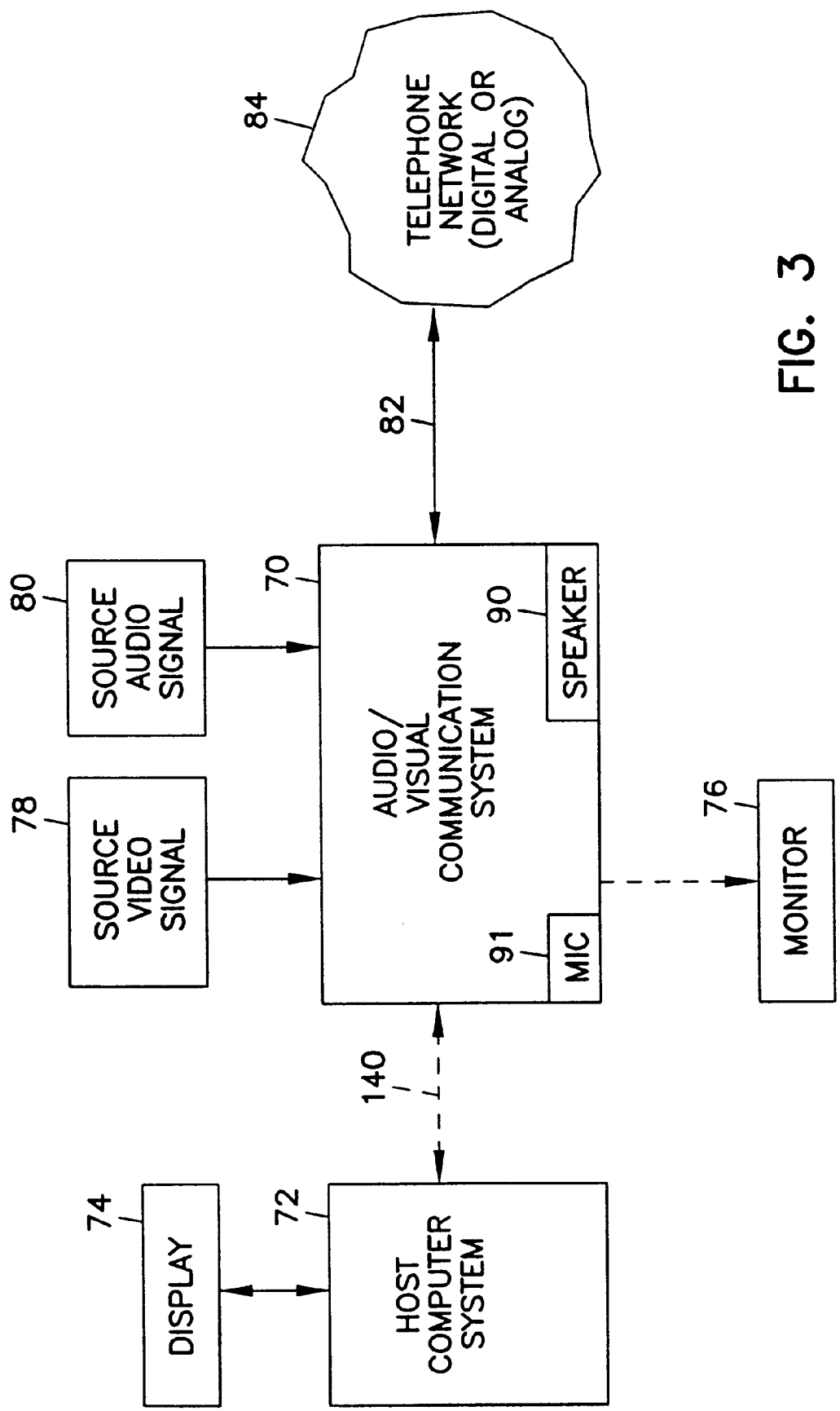
FIG. 3 is an illustration of a video conferencing system employing a novel peripheral audio/visual communication system.

Referring now to the figures, and more particularly to FIG. 3, there is shown a video conferencing system including a novel peripheral audio/visual communication system 70 adapted for communicating source audio and video signals 80 and 78 over a communication channel 82, and receiving remote audio and video signals transmitted over the communication channel 82 from a remote conferencing site. In one embodiment, the peripheral audio/visual communication system 70 is configured to transmit remote video image signals to an external monitor 76 received from a remote conferencing site over the communication channel 82 and remote audio signals to an internal speaker 90. In another embodiment, the audio/visual communication system 70 is configured to communicate with a separate host computer system 72 over a high-speed host computer system output interface 140. Video images received from a remote conferencing site are displayable over a display 74 coupled to the host computer system 72, and remote audio signal are preferably broadcast over the internal speaker 90.

Figure 1:
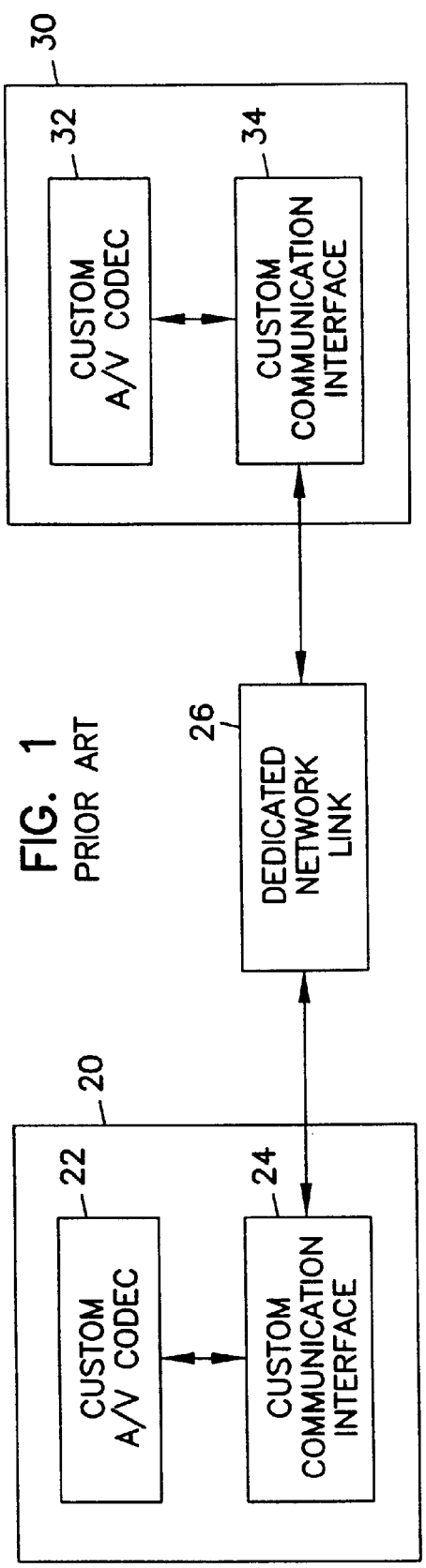
FIG. 1 is a block diagram of prior art video processing systems incorporating custom audio/video components and custom communication interfaces to transmit and receive information over a dedicated network link.
Figure 2:
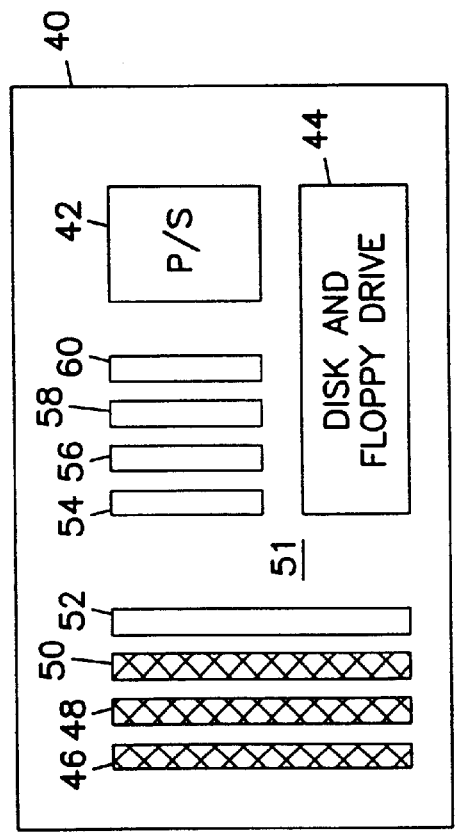
FIG. 2 is a generalized top view of a prior art personal computer system with its housing cover removed and three prior art video teleconferencing cards installed in the computer system.

Upon comparing the novel audio/visual communication system 70 shown in FIG. 3 to the prior art video teleconferencing systems discussed previously with respect to FIGS. 1 and 2, it will become readily apparent that the stand-alone, peripheral audio/visual communication system 70 provides for a substantial reduction in the cost and complexity of effectuating video conferencing. Most noticeably, the peripheral audio/visual communication system 70 provides full-color, full-motion video conferencing between local and remote conferencing sites simply by connecting the audio/visual communication system 70 to a communication channel 82, a standard telephone line for example, a video signal source 78, such as a video camcorder, and an external monitor 76, such as a television monitor, for viewing remote video images. A built-in microphone 91 is adapted to receive local audio signals for communication to a remote conferencing site, and an internal speaker 90 is provided for broadcasting the received remote audio signal. It is noted that the audio/visual communication system 70, being a compact, stand-alone peripheral, is well suited for easy transport to any one of a plurality of desired conferencing sites.

Figure 4:
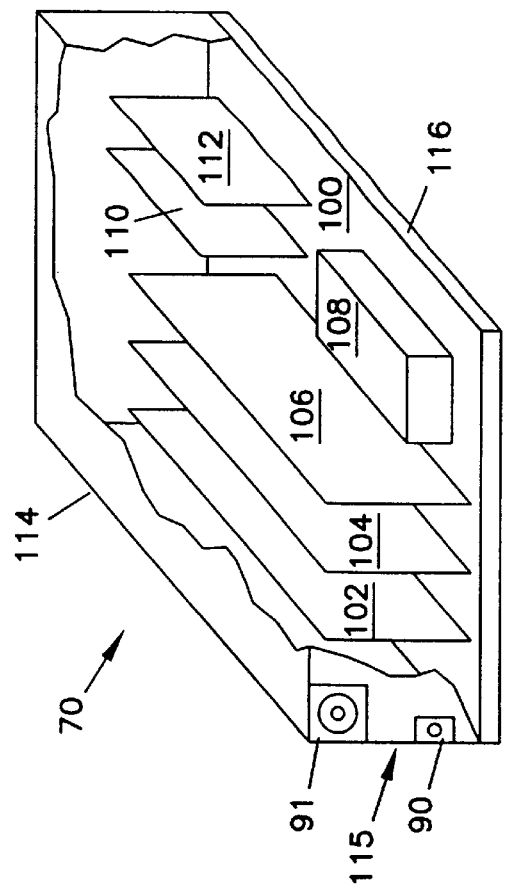
FIG. 4 is an illustration of various system boards of a novel peripheral audio/visual communication system.

One important advantage of the novel audio/visual communication system 70 is the effective uncoupling, or separating, of the various audio and video processing assemblies needed to effectuate video conferencing from a host computer system 72. As illustrated in FIG. 4, all audio and video processing boards and components comprising the audio/visual communication system 70 are housed in a peripheral housing 115 completely separate from the host computer system 72. Accordingly, a user of the peripheral audio/visual communication system 70 need not install any additional cards into the host computer system 72, nor is it necessary for the user to reconfigure the hardware or operating system software of the host computer system 72 to effect high-quality, full-feature video conferencing. A user need only couple the novel peripheral audio/visual conferencing system 70 to a host computer system 72 using a standard connection interface.

As further shown in FIG. 4, a housing cover 114 is detachably secured to a housing base 116 that together comprise a peripheral housing 115 within which the components of the audio/visual communication system 70 are housed. An input/output board 112 preferably includes means for communicating between a motherboard 100 and various connectors, jacks, and transceivers, mounted on a back panel 123 of the peripheral housing 115, audio and video signals communicated between a local and remote conferencing site. A video board 104 processes remote video signals received from the communication channel 82, and transmits processed source video signals 78 acquired from a local conferencing site over the communication channel 82. The audio board 102 processes remote audio signals received from a remote conferencing site, and processes source audio signals 80 for transmission over the communication channel 82.

Figure 14:
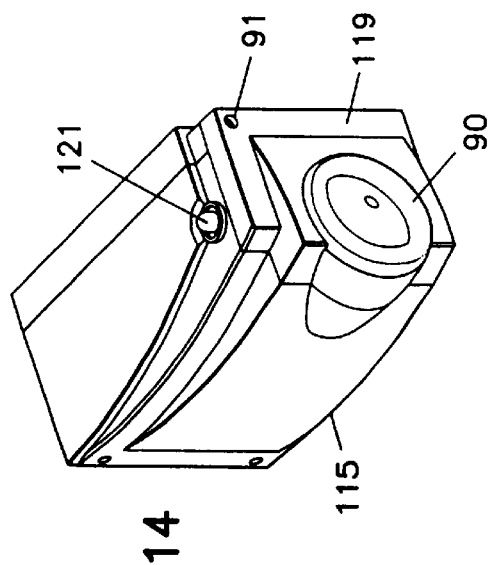
FIG. 14 is an illustration of one embodiment of a peripheral housing configuration for a novel peripheral audio/visual communication system.
Figure 15:
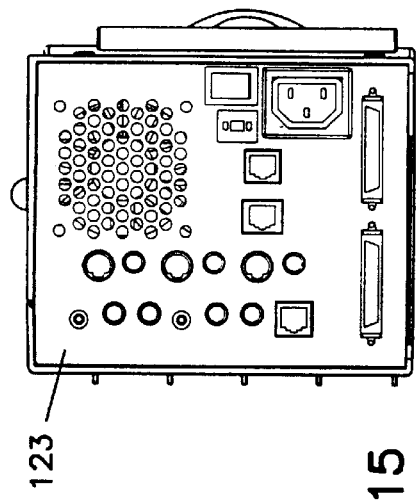
FIG. 15 is an illustration of a back panel of a peripheral housing configured with a plurality of input and output connectors, jacks, and transceivers for a novel peripheral audio/visual communication system.

An alternative configuration of the peripheral housing 115 is illustrated in FIGS. 14 and 15. A housing case 117 is generally rectangular in configuration with open end portions being adapted for respectively receiving a front housing bezel 119 and a back panel 123. The front housing bezel 119 preferably supports a built-in speaker 90 and a built-in microphone 91. A plurality of video, audio, communication channel, and power connectors and adapters are preferably mounted to the back panel 123. A light 121, preferably mounted to the housing case 117, alerts a user of the audio/visual communication system 70 when visual conferencing is in session. It is noted that the light 121 may include an incandescent, fluorescent, light emitting diode, or other known light source.

The transmission and receiving of local and remote audio and video signals over the communication channel 82 is preferably facilitated by a communications board 106 provided within the peripheral housing 115. The communications board 106, being coupled to the motherboard 100 and communication channel transceivers mounted to the pack panel 123, communicates with the audio board 102 and video board 104 to respectively transmit and receive local and remote audio and video signals over the communication channel 82. It is noted that the communication channel 82 is generally connected to a domestic or international communication network 84. It is further noted that the communication channel 82 may be of a conventional analog POTS (Plain Old Telephone Service) configuration or a digital communication channel, such as an ISDN (Integrated Services Digital Network) digital communication channel. The communications board 106 preferably includes a high-speed modem for transmitting audio, video, and other informational signals over an analog communication channel. Power for the audio/visual communication system 70 is provided by a power supply 108 coupled to the motherboard 100. The power supply 108 is preferably a universal switching AC power supply capable of delivering a wide range of supply voltages preferably between 85 and 264 volts and at frequencies ranging between 47 and 63 hertz to operate on both domestic and international power delivery systems.

An important feature of the novel audio/visual communication system 70 concerns the high-speed output interface board 110 adapted for communicating with a separate host computer system 72. In one embodiment, local and remote video signals are communicated to the separate host computer system 72 over a SCSI (Small Computer Systems Interface) interface or bus. In another embodiment, the output interface board 110 comprises a PCMCIA (Personal Computer Memory Card Industry Association) interface or bus for providing high-speed communications between the audio/visual communication system 70 and various types of host computer systems 72, including lap-top computer systems.

Figure 6:
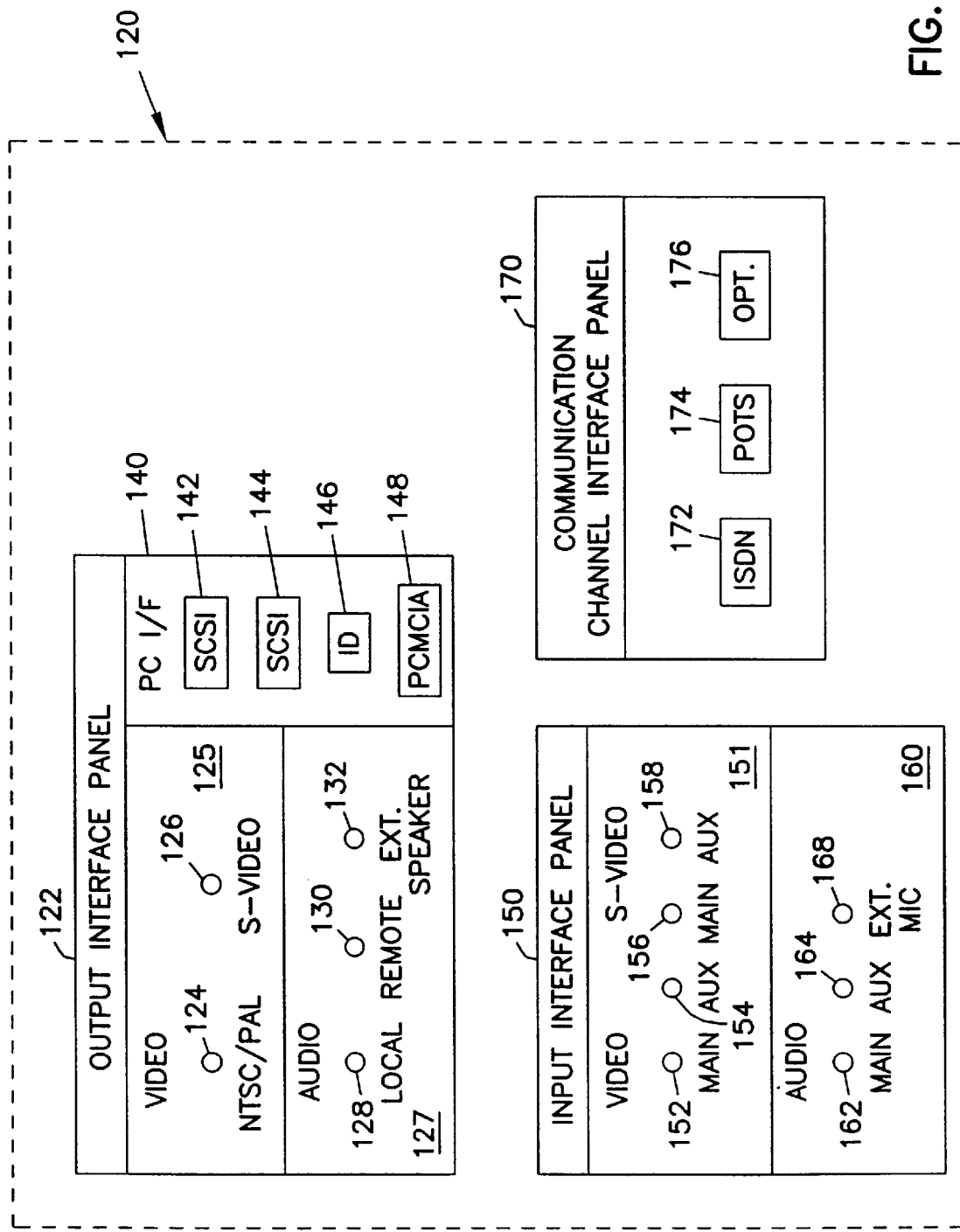
FIG. 6 is an illustration of various connectors, jacks, and transceivers comprising the output, input, and communication channel interfaces of a novel peripheral audio/visual communication system.

Turning now to FIG. 6, there is shown an input/output panel 120 comprising an output interface panel 122, an input interface panel 150, and a communication channel interface panel 170. The input/output panel 120 is preferably configured and mounted as a back panel 123 at the rear of the peripheral housing 115, and provides means for coupling the internal audio, video, and data processing assemblies of the audio/visual communication system 70 to audio and video signal sources 80 and 78, communication channel 82, host computer system 72, external speaker 220, and monitor 76. The input interface panel 150 preferably includes a video input panel 151 and an audio input panel 160. The video input panel 151 preferably includes a main video input jack 152 and an auxiliary video input jack 154 for receiving NTSC (National Television Systems Committee) or PAL (Phase Altering Line) source video signals 78. A video camera or camcorder is generally connected to the main video input jack 152, while a video cassette recorder (VCR) is usually connected to the auxiliary video input jack 154, although a second video camera may be used instead of a VCR. The video input panel 151 further includes main and auxiliary S-video input jacks 156 and 158 for receiving video signals from an S-video source 78.

The audio input panel 160 preferably includes a main audio input jack 162 and an auxiliary audio input jack 164, with both audio inputs 162 and 164 preferably being 2.0 volt line level compatible inputs. The main audio input jack 162 is generally connected to the audio output of a video camera or camcorder, wherein the audio output signal produced by the video camcorder's build-in microphone is received by the audio input jack 162. The auxiliary audio input jack 164 is usually connected to a VCR, but may alternatively be connected to the audio output of a second video camera or camcorder. An external microphone jack 168 is provided to receive audio input signals from an external microphone, and, when utilized, preferably disables the built-in microphone 91 provided on the peripheral housing 115.

The output interface panel 122 preferably includes a video output panel 125, an audio output panel 127, and a host computer system interface panel 140. Remote video signals received over the communication channel 82 may be displayed on an external monitor 76 by coupling the external monitor 76 to the video output jack 124. The output video signal provided at the output video jack 124 preferably conforms to one of either of the composite NTSC or PAL video signal standards. An S-video output jack 126 is provided to permit connectivity to an S-video device.

The audio output panel 127 preferably includes a local audio output jack 128 and a remote audio output jack 130. The local audio output jack 128 is adapted to communicate audio signals produced at the local conferencing site, while the remote audio output jack 130 is adapted to communicate remote audio signals received from a remote conferencing site. The local and remote audio output jacks 128 and 130 are usually connected to the left and right audio inputs of a stereo VCR. An external speaker jack 132 provides means for broadcasting remote audio signals over an external speaker 220. It is noted that remote audio signals are preferably routed to an internal speaker 90 unless an external speaker 220 is connected to the external speaker jack 132, wherein the internal speaker 90 is preferably disabled.

In one embodiment, as discussed previously, the audio/visual communication system 70 provides stand-alone video conferencing capability simply by connecting audio and video signal source devices 80 and 78 to the audio and video input jacks 162 and 152 of the input interface panel 150, connecting an external monitor 76 to the video output jack 124, and connecting a standard or digital telephone line to the communication channel interface panel 170. In this configuration, the audio/visual communication system 70 provides full-color, full-motion video conferencing over a communication channel 82, with remote video images being displayed on the monitor 76 and the remote audio signals being broadcast over the internal speaker 90.

The functionality of the video conferencing system illustrated in FIG. 3 is generally enhanced by coupling the peripheral audio/visual communication system 70 to a separate host computer system 72, and operating visual conferencing application software preferably configured to operate on, and in cooperation with, the host computer system 72. The host computer system 72 and accompanying visual conferencing application software preferably cooperates with the audio/visual communication system 70 to coordinate the presentation of remote and local video images on a display 74 coupled to the host computer system 72, and to generally enhance the functionality of the audio/visual communication system 70. The visual conferencing application software package accompanying the audio/visual communication system 70 is preferably adapted to operate on most popular personal computer systems, and in cooperation with a variety of industry standard operating systems. In one embodiment, the visual conferencing application software package is preferably operable on both Windows® and Macintosh® based computer systems.

The output interface panel 122 includes a host computer system interface or interface panel 140 which preferably comprises an SCSI interface and output connector 142 and/or a PCMCIA interface and output connector 148. A second SCSI or PCMCIA interface and output connector 144 is preferably available for daisy-chaining the audio/visual communication system 70 to other SCSI or PCMCIA peripheral devices. An identification (ID) switch 146 is provided to uniquely identify the audio/visual communication system 70 amongst other peripheral devices communicating over a common SCSI bus 113. The host computer system 72, when coupled to the host computer interface panel 140, communicates with the audio/visual communication system 70 preferably by issuing one or more coordination instructions to configure and coordinate the operation of the audio/visual communication system 70.

Connectivity between the audio/visual communication system 70 and the communication channel 82 is preferably provided by a communication channel interface panel 170. Communication over either an ISDN digital communication line or a standard analog POTS communication line is selectably provided by an ISDN transceiver 172 and a POTS transceiver 174. Video conferencing over a standard analog POTS line is facilitated by an internal modem preferably operable at a baud rate of up to 28,800 kilobits per second (kbit). The ISDN transceiver 172 is preferably connected to a Basic Rate ISDN (BRI) digital communication channel 82 which provides two 64 kbit data channels, one 16 kbit voice channel, and one 64 kbit signaling channel. The communication channel interface panel 170 may further include an optional channel transceiver 176 for communicating over a Primary Rate ISDN (PRI) communication channel, a T1 line, a Switch-56 line, and various local and wide area networks.

Figure 5:
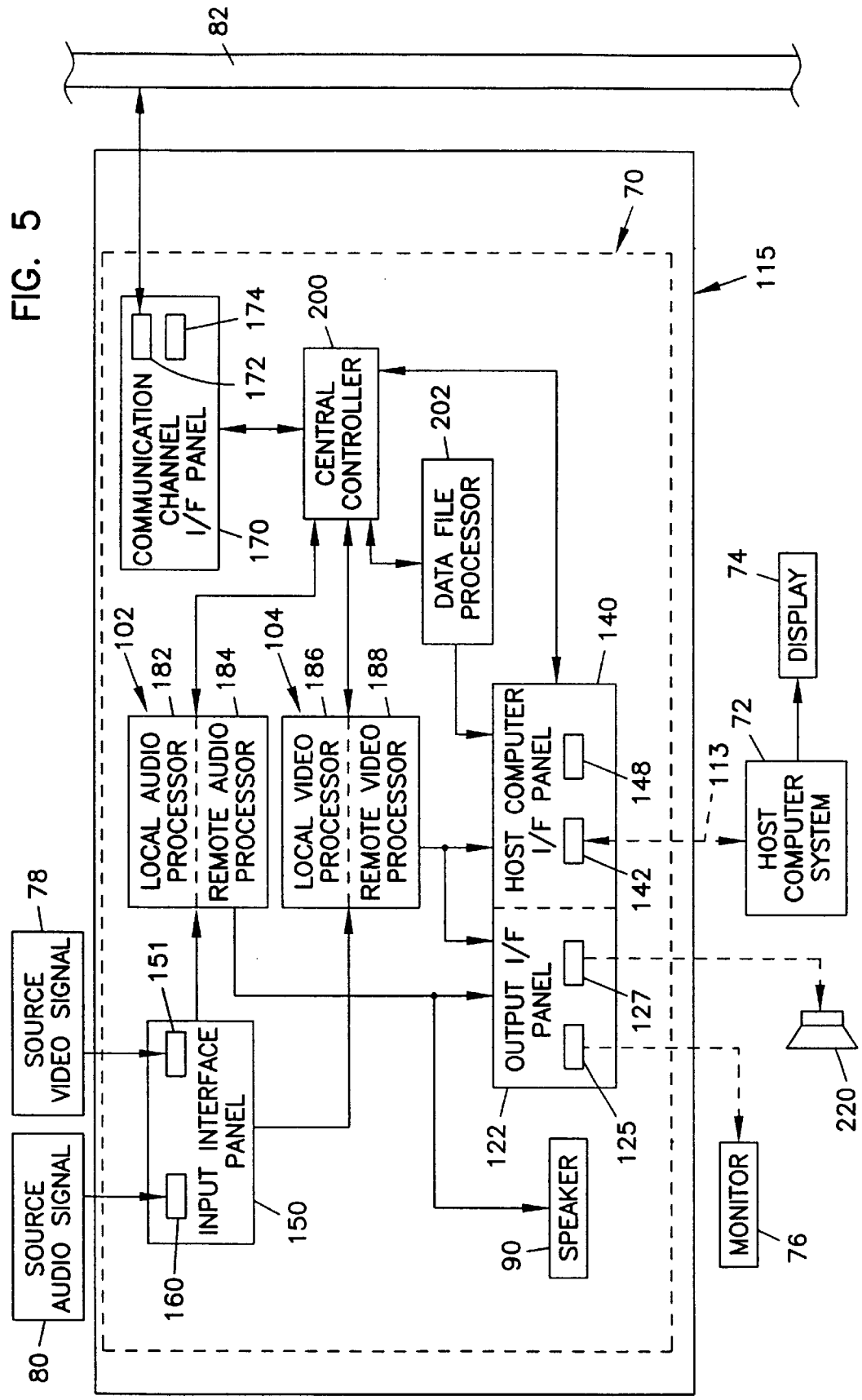
FIG. 5 is a system block diagram of a novel peripheral audio/visual communication system coupled to a communication channel.

Referring now to FIG. 5, there is shown a generalized block diagram of a video conferencing system comprising a peripheral audio/visual communication system 70 and a separate host computer system 72. Source audio and video signals 80 and 78 are received by an input interface panel 150 comprising appropriate input connectors and jacks. The input interface panel 150 is preferably configured to receive source video signals 78 provided by at least two video sources, including a video camera and a VCR, or, alternatively, two video cameras, for example. The source audio signal 80, received from a built-in microphone 91 or an external microphone, is preferably transmitted to the local audio processor 182 of the audio board 102. The source video signal 78 is preferably transmitted to the local video processor 186 of the video board 104.

The local audio processor 182 receives the source audio signal 80 preferably from the audio input panel 160 and transmits the source audio signal 80 to a central controller 200. A communication channel interface panel 170 receives the source audio signal 80 transmitted from the central controller 200, and, in turn, transmits the source audio signal 80 to the communication channel 82. In one embodiment, the local audio processor 182 converts the source audio signal 80 to a corresponding compressed audio signal of a predetermined compressed format for efficient transmission over the communication channel 82.

The source video signal 78, received by the video input panel 151, is transmitted to a local video processor 186 provided on the video board 104. The local video processor 186 processes the source video signal 78 for transmission to the central controller 200, which, in turn, transmits the source video signal 78 to the communication channel interface panel 170 for transmission over the communication channel 82. In one embodiment, the local video processor 186 converts the source video signal 78 received from the video input panel 151 to a corresponding compressed video signal of a predetermined compressed digital format for efficient transmission over the communication channel 82. It is noted that the source video signal 78 and associated audio signal 80 are generally transmitted together as a combined, audio/video signal over the communication channel 82. The central controller 200 preferably synchronizes the associated audio and video signals 80 and 78 when producing a combined audio/video signal.

Still referencing FIG. 5, a remote audio signal transmitted over the communication channel 82 is preferably received by the communication channel interface panel 170 and communicated to the central controller 200. The central controller 200 transmits the remote audio signal to a remote audio processor 184 provided on the audio board 102. The remote audio processor 184 includes means for converting a compressed remote audio signal to a corresponding remote decoded audio signal. The remote decoded audio signal is preferably transmitted to an internal speaker 90 provided on the peripheral housing 115. The remote decoded audio signal is also transmitted to the output interface panel 122 and, specifically, to the external speaker jack 127. Connecting an external speaker 220 to the external speaker jack 127 for broadcasting of the remote decoded audio signal preferably disables the internal speaker 90.

The communication channel interface panel 170 also receives remote video signals from the communication channel 82, and transmits the remote video signals to the central controller 200 for processing by a remote video processor 188 provided on the video board 104. The remote video processor 188 typically receives from the central controller 200 a compressed remote video signal which is preferably converted by the remote video processor 188 to a corresponding remote decoded video signal. The video board 104 preferably transmits the remote decoded video signal to both the host computer interface panel 140 and the video output panel 125. An external monitor 76 may be connected to the video output panel 125 for displaying thereon a video image associated with the remote decoded video signal. The remote decoded video signal received by the host computer interface panel 140 is preferably transmitted to the SCSI interface 142 or PCMCIA interface 148 for communication to a separate host computer system 72 coupled to the audio/visual communication system 70. The host computer system 72 preferably coordinates presentation of a video image associated with the remote decoded video signal on a display 74 coupled to the host computer system 72.

In one embodiment, the video board 104 transmits the source video signal 78 together with the remote decoded video signal to the host computer interface panel 140. A combined video signal corresponding to the combination of the source video signal and remote decoded video signal is preferably transmitted to the host computer system 72 for simultaneous presentation on the display 74. Video images associated with the source and remote decoded video signals may respectively be displayed as side-by-side video images, picture-in-picture images, or any other desired combination of source and remote video images on the display 74. The formatting and presentation of the source and remote video images is preferably controlled by the host computer system 72, and more typically, by cooperation of the host computer system 72 and visual conferencing application software operating thereon.

The audio and video processors 182, 184, 186, and 188 of the audio and video boards 102 and 104 preferably comprise compression and decompression chips, also termed CODEC chips, that encode and decode audio and video signals in accordance with an internationally recognized video conferencing standard. One suitable video conferencing standard is the CCITT H.320 standard promulgated by the Consultative Committee on International Telephony and Telegraphy, a body of the International Telegraph Union (ITU) established by the United Nations. The CCITT H.320 video conferencing standard includes several sub-standards, including a video compression standard H.261, a channel coding standard H.221, and audio compression standards G.711, G.722, and G.728.

In accordance with another embodiment, the audio/visual communication system 70 includes a high-speed data pipe or data transfer capability for transferring data files over the communication channel 82. A standard data file residing on the host computer system 72, for example, is preferably transmitted to a data file processor 202 through the host computer interface panel 140. The central controller 200 then receives the data file transmitted from the data file processor 202, and, in turn, transmits the data file to the communication channel interface panel 170. The communication channel interface panel 170 transmits the data file through an ISDN transceiver 172 when the audio/visual communication system 70 is communicating over an ISDN digital communication channel 82. A high-speed modem (not shown), preferably provided on the communication board 106, receives the data file from the central controller 200 prior to transmitting the data file over the POTS transceiver 174 of the communication channel interface panel 170. The data file processor 202 preferably comprises data compression means to convert a standard data file to a compressed data file of a predetermined compressed format for high-speed transmission over the communication channel 82.

A remote data file may be received by the communication channel interface panel 170, transmitted to the central controller 200, and then communicated to the data file processor 202. A compressed remote data file is preferably converted to a standard remote data file by the data file processor 202, and transmitted to the host computer system 72 through the host computer interface panel 140. A high-speed data file transfer link or data pipe between a local host computer system 72 and a remote host computer system (now shown) is thus facilitated by the data file processor 202 of the audio/visual communication system 70.

The data file processor 202 preferably provides high speed, bi-directional data communication between two host computer systems communicating over the communication channel 82. Various visual conferencing enhancement features including file transfer, screen sharing, document collaboration, and other data exchange features are provided by the data file processor 202 operating in conjunction with two host computer systems communicating over the communication channel 82. Coordination of the file transfer process is both simple and reliable. The local host computer system 72, for example, preferably transfers data blocks over the communication channel 82 whenever a local SEND status is set to TRUE, thus indicating that the remote host computer system is available to receive the data blocks. The local SEND status is initially set to TRUE and then subsequently set to FALSE after transmitting a first set of data blocks. The remote host computer system, after receiving the first set of data blocks from the communication channel 82, preferably transmits an OK SEND status signal to the local host computer system 72, but only after receiving the first set of local data blocks without error. Additional data blocks may then be transferred by the local host computer system 72 to the remote host computer system.

A RECEIVE status signal indicates that incoming data blocks have been received from a remote conferencing site and are awaiting processing at the local conferencing site. The local host computer 72 will transmit an OK SEND status signal to the remote conferencing site after processing the incoming data blocks. If a data block is not properly communicated between a local host computer system 72 and a remote host computer system, the data block will automatically be re-transmitted. Accordingly, an overrun condition or loss of data is precluded. The data file processor 202 preferably handles all handshaking and error detection/correction procedures. The data file processor 202 preferably further comprises double buffering means to ensure optimum utilization of the communication channel 82 transmission bandwidth. Double buffering permits the local host computer system 72, for example, to transmit a second set of data blocks to the data file processor 202 while the first set of data blocks is being transmitted over the communication channel 82.

Figure 11:
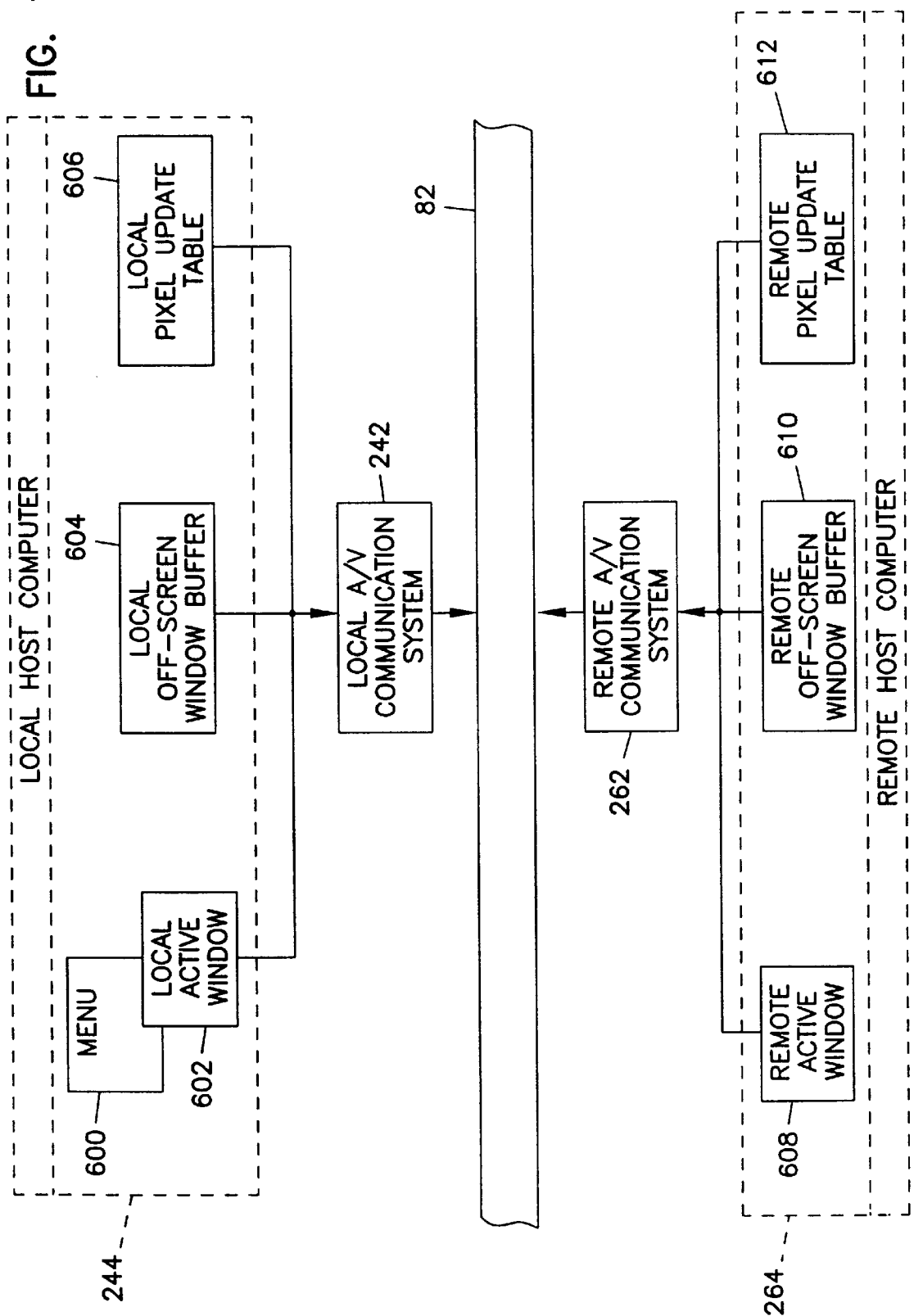
FIG. 11 is a diagrammatic illustration of a video conferencing system configuration employing two novel peripheral audio/visual communication systems, with associated host computer systems coupled thereto, cooperatively communicating to provide window sharing and document collaboration between a local and remote conferencing site.
Figure 12:
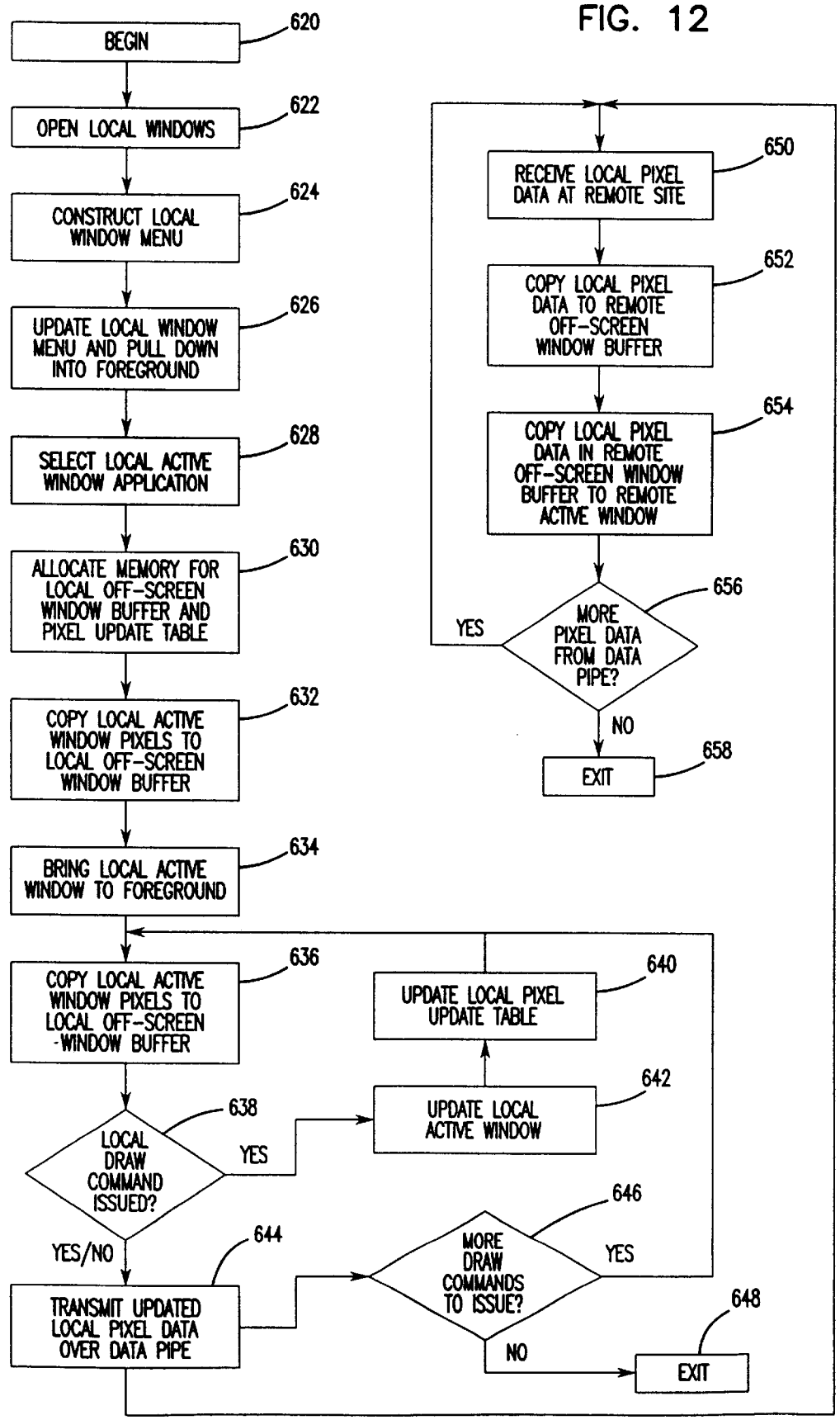
FIG. 12 is a generalized flow diagram illustrating various process steps associated with window sharing and document collaboration operations coordinated by visual conferencing application software operating on a host computer system in cooperation with a novel peripheral audio/visual communication system.

An important feature provided by the high-speed data pipe or data transfer capability of the audio/visual communication system 72 is the ability to view and modify a document simultaneously displayed at a local and remote conferencing site. Referring now to FIGS. 11 and 12, the novel peripheral audio/visual conferencing system operates in cooperation with a host computer system and visual conferencing application software to provide window sharing and document collaboration functions which may be initiated at either a local or remote conferencing site. It is assumed that the operating systems of the local and remote host computer systems 244 and 264 are capable of operating at least one software application within one of a plurality of activatable software application windows.

A user of the local host computer system 244, for example, preferably initiates window sharing and document collaboration by first opening one or more local application windows at step 622. A local window menu 600 is constructed at step 624 using as entry selections the names or designations of the previously opened window applications. The local window menu 600 is preferably updated at step 626 to include the names or designations of all subsequently opened application windows immediately before the local window menu 600 is pulled down into the foreground of the local display 248 by the user. The applications associated with each of the windows are preferably presented in alphabetical order for selection in the menu 600.

The user, at step 628, then selects a local active application window 602 from the menu 600 for sharing with a remote conferencing site. The local host computer system 244, at step 630, preferably allocates an appropriate amount of system memory to accommodate a local off-screen window buffer 604 and a local pixel update table 606. A copy of the pixels or pixel data defining the local active window 602 is transferred to the local off-screen window buffer at step 632. The local active window selected from the window menu 600 is then brought to the foreground of the local display 248 at step 634. All of the pixels comprising the video image within the local active window 602 presented in the foreground of the local display 248 are then copied to the local off-screen buffer 604 at step 636.

The visual conferencing application software senses whether a local draw command has been issued at step 638, typically by sensing the activity of a mouse or keyboard comprising the local user interface 246, for example. In response to the local draw command, the local active window 602 pixels affected by the local draw command are modified or updated at step 642. The modified pixel data within the local active window 602 is recorded or updated in the local pixel update table 606 at step 640, typically in the form of pixel characteristic and location data. The updated pixel data is then copied to the local off-screen window buffer 604 at step 636, thus resulting in a mirror image of the local active window 602 being maintained in the local off-screen window buffer 604. In practice, original pixel data residing at particular memory locations in the off-screen window buffer 604 is generally overwritten or replaced by modified pixel data corresponding to the same memory locations.

At an appropriate time, the pixel data residing in the local off-screen window buffer 604 is transferred to the local audio/visual communication system 242 for transmission over the communication channel 82 at step 644. It is noted that the transmission of local pixel data over the data pipe or communication channel 82 at step 644 may proceed subsequently to or concurrently with the processing steps 638, 642, 640, and 636 associated with modifications made to the local active window pixels.

A remote host computer system 264 preferably operates visual conferencing application software substantially similar to that operating on the local host computer system 244 to enhance video conferencing between the local and remote conferencing sites. After establishing a communication link between the local and remote host computer systems 244 and 264, a full update of pixel data associated with the video image of the entire local active window 602 as reflected in the local off-screen window buffer 604 is initially transmitted over the communication channel 82 and received by the remote audio/visual communication system 262 at step 650. The pixel data associated with the entire local active window 602 is first copied to the remote off-screen window buffer 610 at step 652, and subsequently transferred at step 654 to the remote active window 608 presented in the foreground of the remote display 268.

The modified local pixel data transmitted at step 644 over the data pipe 82 is received at the remote conferencing site at step 650, then copied to the remote off-screen window buffer 610 at step 652, and subsequently transferred at step 654 to the remote active window 608 to update the video image presented therein. It is noted that a conferencing party at the remote conferencing site may also effect changes to the document or application currently shared within the local and remote active windows 602 and 608. The remote host computer system 264 preferably cooperates with visual conferencing application software to coordinate window sharing, modification, and updating in a manner similar to that previously discussed with respect to the local host computer system 244.

During the window sharing and document collaboration procedures, a full update or transfer of all of the pixel data associated with either of the local or remote active windows 602 and 608 is generally performed when a conferencing party modifies the size of an active window, or upon the expiration of a predetermined amount of time programmed into an automatic timer for the purpose of periodically refreshing the local and remote active windows 602 and 608. It is noted that the incremental updating of pixel information is performed primarily to optimize usage of the available transmission bandwidth of a limited bandwidth communication channel 82. Other optimization schemes, such as converting the pixel data to a compressed format using one of a number of standard compression schemes, may be employed to increase the transfer efficiency of pixel data between a local and remote conferencing site when performing window sharing and document collaboration functions.

One important advantage of the novel audio/visual communication system 72 concerns its operability with a variety of host computer systems 70 and associated operating systems. The ability to communicate with virtually all popular host computer system platforms and operating systems significantly enhances the portability of the audio/visual communication system 70, and makes full-feature video conferencing readily available for most commercial, governmental and personal uses. Multiple platform and cross-platform (operation between two computer computers operating under dissimilar operating systems) video conferencing is preferably facilitated by visual conferencing application software operable on the host and/or remote computer systems.

In general, the manner in which video data is processed by a given host computer system 72 differs from one computer system manufacturer to another. Since no single video processing standard has been adopted for exclusive use among the manufacturers of host computer systems, the novel audio/visual communication system 70 preferably performs substantially all of the significant video processing tasks prior to transferring the video data over an output interface 140 to an attached host computer system 72 for presentation on a display 74. Virtually all popular host computer systems 72 are generally configured to communicate over one of a limited number of standard output interfaces 140, such as an SCSI 142 or PCMCIA 148 interface, for example. The audio/visual communication system 70 provides processor-independent compatibility with virtually all popular host computer systems 72 by formatting video data into a form amenable for transmission over the standard output interface 140 and processing by a specific host computer system 72 coupled to the audio/visual communication system 70.

A host computer system 72, in cooperation with visual conferencing application software operating thereon, preferably issues a variety of coordination instructions to the audio/visual communication system 70 to facilitate video conferencing between a local and remote conferencing site. The host computer system 72 preferably coordinates the transfer of video frame data between the audio/visual communication system 72 and the host computer system 72.

The host computer system 72 preferably issues read and write request instructions to the audio/visual communication system 70 to coordinate the transfer of video data therefrom in a manner similar to that when communicating with other peripheral devices, such as a disk drive array, for example. In response to the read and write request instructions, the audio/visual communication system 70 transfers a requested number of video frames and other configuration parameters between the host computer system 72 and the audio/visual communication system 70. In accordance with this embodiment, the audio/visual communication system 70 operates in a slaved relationship with the host computer system 72, whereby all coordination instructions are produced by the host computer system 72, and responded to by the audio/visual communication system 70.

In one embodiment, the output interface 140 comprises a SCSI interface 142, wherein communication between the host computer system 72 and the audio/visual communication system 70 conforms to one of a number of standard SCSI communication protocols, such as SCSI-I and SCSI-II protocols. The host computer system 72 preferably produces coordination instructions or commands in the form of parameter blocks. Each parameter block typically includes an operation code or opcode field that specifies the particular operation to be executed, and also includes associated data and configuration parameters used to perform the operation. The opcode field is generally included at the beginning of the parameter block followed by configuration parameters and data unique to the particular opcode. The configuration parameters typically specify the type of video data and manner in which the video data transferred from the audio/visual communication system 72 is to be presented on the display 74.

Figure 10:
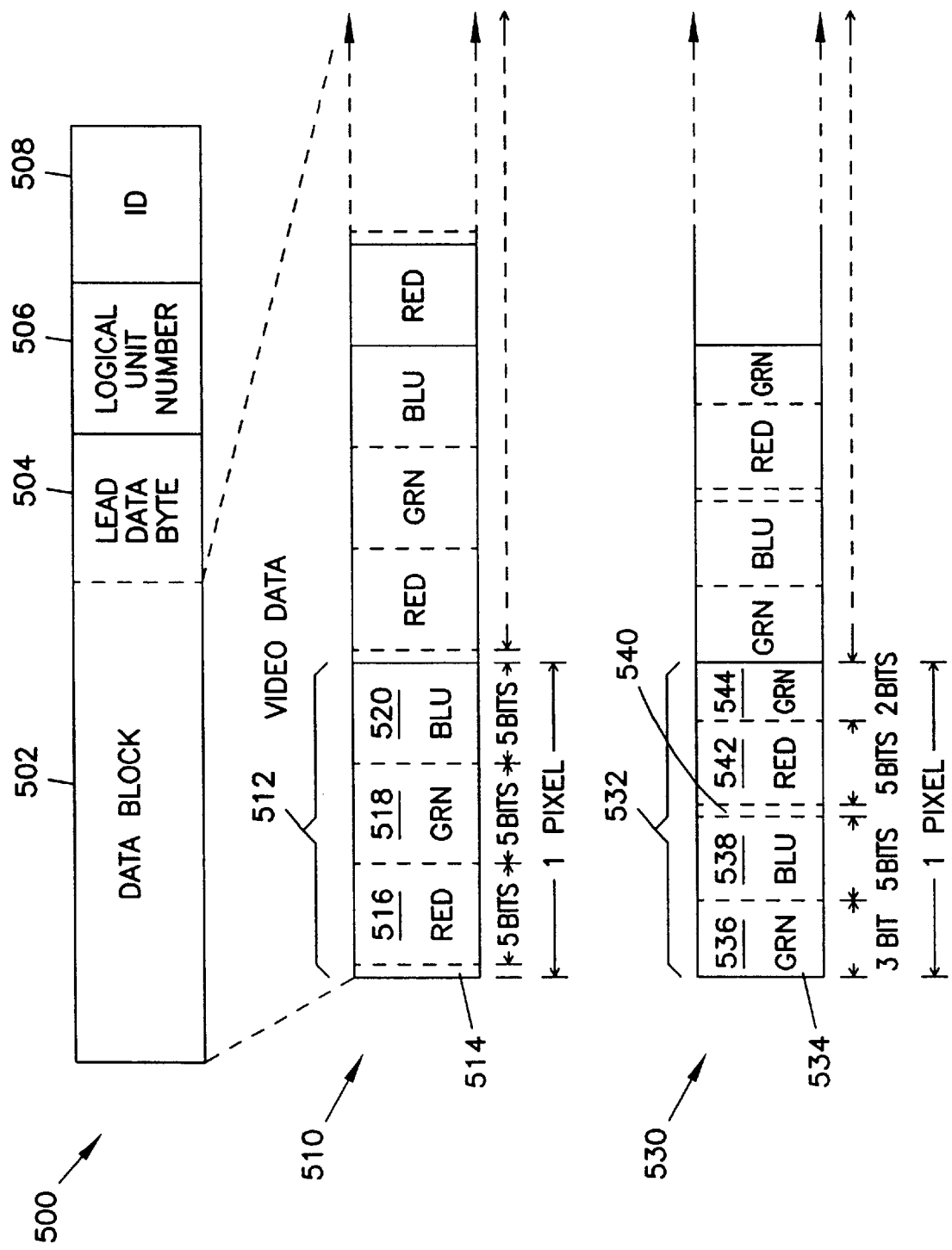
FIG. 10 is a generalized illustration of various informational fields comprising a read or write coordination instruction produced by a host computer system and accompanying visual conferencing application software operating thereon, and transmitted over a high-speed interface coupling the separate host computer system and a novel peripheral audio/visual communication system.

For example, as illustrated in FIG. 10, there is shown a generalized diagram of typical information contained in a read or write coordination instruction 500 suitable for coordinating communications between the host computer system 72 and the audio/visual communication system 70 over the SCSI output interface 142. It is to be understood that peripheral communication protocols other than one conforming to the SCSI standard may be employed for effecting communications between the host computer system 72 and the audio/visual computer system 70 without departing from the scope of the present invention. By way of example, a PCMCIA interface 148 and associated communication protocol may be employed.

By way of illustration and not of limitation, the coordination instruction 500 shown in FIG. 10 comprises an ID field 508, a logical unit number field 506, and a data block field 502 which includes a lead data byte field 504. Both read and write request instructions are preferably structured to include the informational fields illustrated in FIG. 10. The ID field 508 provides an identification to distinguish the audio/visual communication system 70 from other peripheral devices communicating over the SCSI bus 113. The logical unit number field 506 preferably indicates the type of data being transferred when the host computer system 72 is reading or transferring the information from the audio/visual communication system 72. The logical unit number field 506 is preferably implicated only during a read transfer operation, and is typically set to zero during write transfer operations.

The type of data transferred during a write transfer operation is preferably indicated by the lead data byte field 504 of the data block field 502. The specific information or data being transferred during either a write or read transfer operation is preferably contained within the data block field 502. The number of bytes comprising the data block field 502 is preferably dependent on the specific type of read or write request instruction generated by the host computer system 72. For example, if the host computer system 72 issues a read request instruction to transfer video information from the audio/visual communication system 70 to the host computer system 72, a predetermined fixed number of video data bytes are transferred in the data block field 502. When the host computer system 72 issues a read status request instruction, for example, a predetermined fixed number of data bytes associated with the status information is transferred in the data block field 502. By further example, when the host computer system 72 writes a block of data to the audio/visual communication system 70, the size of the data block 502 being transferred is obtained from reading the lead data byte field 504 within the data block 502. Accordingly, each specific type of coordination instruction 500 has an associated predefined data block field 502 size.

In further reference to FIG. 10, the video data contained in the data block field 502 is shown organized in an RGB format for a matrix of pixels, with each pixel corresponding to a single dot or point on a color television screen or monitor. Each pixel 512, in turn, consists of red, green, and blue color components. The format of the pixel data of the data block 502 is preferably dependent on the particular CPU (Central Processing Unit) of the host computer system 72. The red, green, and blue color components are preferably quantified in three 5-bit fields 516, 518 and 520 for Macintosh®/Motorola® based computer systems. In practice, 16 bits, or two 8-bit bytes, of color component data are preferably associated with each individual pixel 512. As such, the extra most significant bit 514 is preferably set to zero. For host computer systems 72 employing a Windows®/Intel® based architecture, the color components of each pixel 532 are preferably quantified in the following field sequence 530: a 3-bit green field 536, a 5-bit blue field 538, a 1-bit unused field 540, a 5-bit red field 542, and a 2-bit green field 544. It can be appreciated that quantifying the three color components for each pixel configuration 512 and 532 in accordance with these preferred formats provides up to 32,678 ($2^{15}$) color combinations. It is to be understood that other host processors or CPUs can be employed in the host computer system 72 other than those discussed above, and that the audio/visual communication system 72 can accommodate such other processors by formatting the pixel data associated with local and remote video signals in a form amenable for transmission over the output interface 140 and processing by the particular host computer system 72.

It is noted that a video data block field 502 generally consist of a repeating sequence of red, green, and blue data fields (not necessarily in this order), with the maximum amount of pixel data comprising a single data block field 502 being limited by the predefined data block 502 size dictated by the specific read or write video transfer coordination instruction being executed by the host computer system 72. A typical coordination instruction associated with a picture-in-picture display command parameter block, for example, is represented in the following C language software code:

```
OSErr VBoxHostPIP (long width, long height, long
croppedX, long cropped Y, long top, long left,
RGBColor borderColor, short borderWidth)
{
OSErr err;
S_HOST_PIP op;                              //  parameter block
op.opcode=OP_HOST_PIP;                      //  opcode
op.sizex=width;                             //  specific
                                                parameters
op.sizey=height;
op.cropx=croppedX;
op.cropy=croppedY;
op.posx=top;
op.posy=left;
op.color=0;
op.color=borderColor.red>>11;
op.color<<=5;
op.color+=borderColor.green>>11;
op.color<<=5;
op.color+=borderColor.blue>>11;
op.width=borderWidth;
gHeader[0]=kSCSIWrite;                      //  SCSI command
block header
gHeader[1]=0;
gHeader[2]=sizeof(S_HOST_PIP)>>16;
gHeader[3]=sizeof(S_HOST_PIP)>>8;
gHeader[4]=sizeof(S_HOST_PIP);
gHeader[5]=0;
gBlock[0].scOpcode=scNoInc;                 //  SCSI command
gBlock[0].scParam1=(long)&op;
gBlock[0].scParam2=sizeof)S_HOST_PIP);
gBlock[1].scOpcode=scStop;
gBlock[1].scParam1=0;
gBlock[1].scParam2=0;
err=VBoxWaitBusy();
if (err == no Err)
return (SendWriteCommandToSCSI (&gHeader, gBlock) );
else
return err;
```

The software code for other coordination instructions structured in parameter block form is preferably similar to that presented for illustrative purposes above for a picture-in-picture display instruction.

The coordination instructions associated with the transfer of data file information over the communication channel 82 to facilitate window sharing and document collaboration are preferably structured in a parameter block command format similar to that illustrated in FIG. 10. An operation code or opcode and block length code are typically the first two parameters of a data transfer coordination instruction. These two parameters preferably define the structure and content of the entire data transfer parameter block command. The opcode for a draw or display coordination instruction, for example, will typically include a display opcode, a block length code defining the total number of bytes comprising the parameter block command, and a plurality of pixel data indicating the screen location and characteristics of each pixel.

To facilitate data transfer across different host computer platforms, the pixel data may include additional data in the form of embedded commands that instruct a particular CPU to process the pixel data in a particular manner. When two similar CPUs are communicating data across the communication channel 82, the imbedded command may be ignored or, preferably, not included in the pixel data. When cross-platform transferring of data is desired, the receiving CPU preferably extracts the imbedded commands and processes the associated pixel data as instructed. An embedded command, for example, may instruct the receiving CPU to swap the position of specific color bits within the block of pixel data as previously discussed with regard to FIG. 10.

Figure 7:
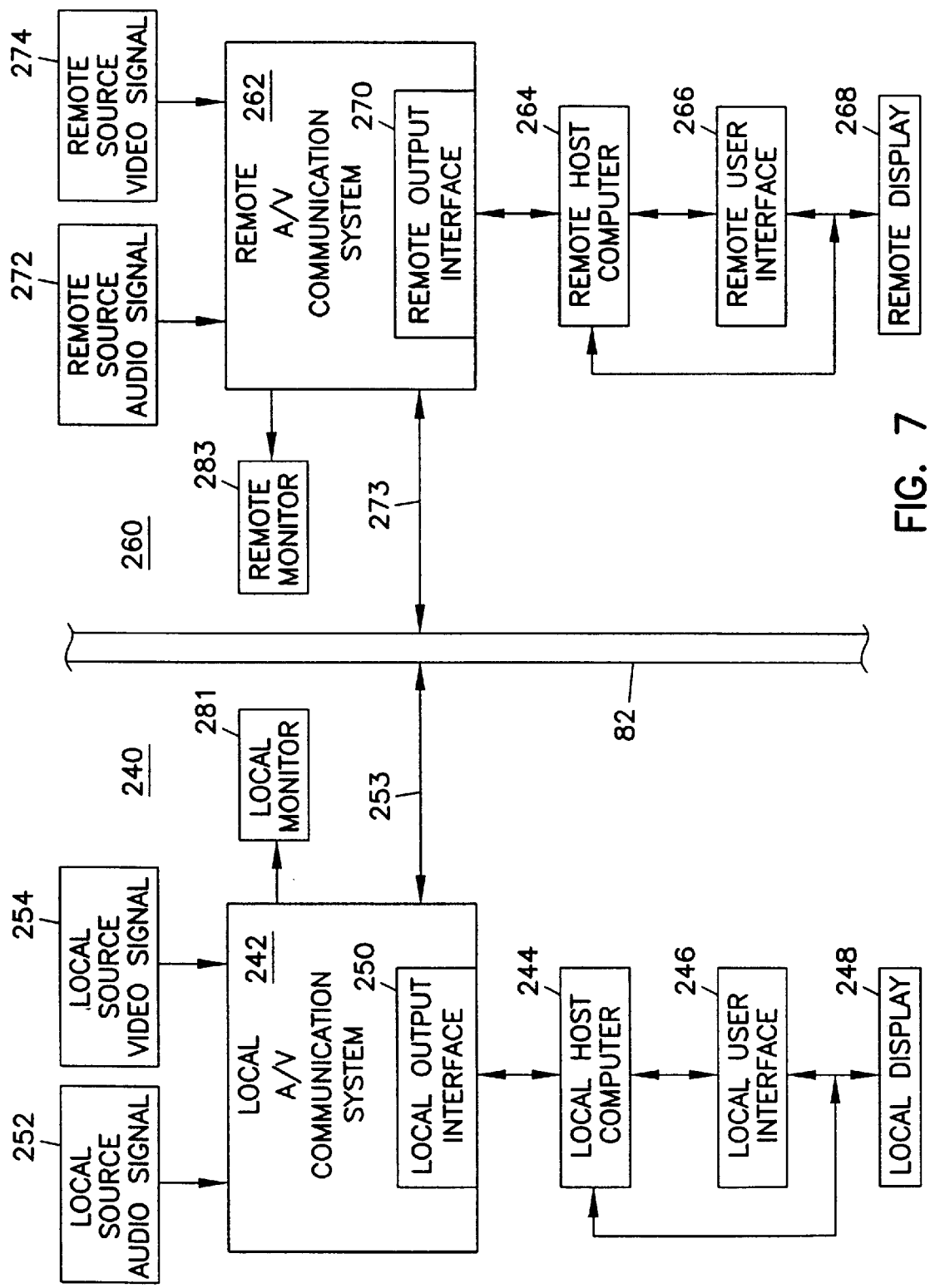
FIG. 7 is a diagrammatic illustration of a video conferencing system employing two novel peripheral audio/visual communication systems that provide video conferencing between local and remote conferencing sites over a communication channel.

In another embodiment, as illustrated in FIG. 7, a local audio/visual communication system 242 and a remote audio/visual communication system 262 are shown communicating over a communication channel 82. The local and remote audio/visual communication system 242 and 262 preferably operate in conformance with an industry recognized international communications standard, such as the CCITT H.320 standard. The local audio/visual communication system 242 receives and processes local source audio and video signals 252 and 254 from a local conferencing site 240. The local source audio and video source signals 252 and 254 are then transmitted to a communication channel 82. The local source audio and video signals 252 and 254 transmitted over the communication channel 82 are received and processed by the remote audio/visual communication system 262 situated at a remote conferencing site 260.

Remote source audio and video signals 272 and 274 are received and processed by the remote audio/visual communication system 262, transmitted over the communication channel 82, and received and processed by the local audio/visual communication system 242. A local monitor 281 may be coupled to the local audio/visual communication system 242 to display remote video images received from the remote conferencing site 260. Similarly, a remote monitor 283 may be coupled to the remote audio/visual communication system 262 to display local video images at the remote conferencing site 260. In accordance with this embodiment, full-color, full-motion stand-alone video conferencing is provided by the local and remote audio/visual communication systems 242 and 262 respectively coupled to local and remote monitors 281 and 283, and to the communication channel 82.

In accordance with another embodiment, each of the local and remote audio/visual communication systems 242 and 262 is respectively coupled to a local and host computer system 244 and 264 by a local and remote output interface 250 and 270. The local and remote host computer systems 244 and 264 respectively coordinate the transfer of video information between the local and remote audio/visual communication systems 242 and 262 for presentation on the local and remote displays 248 and 268. Additionally, the local and host computer systems 244 and 264 preferably configure, adjust, and modify various operational parameters of the local and remote audio/visual communication systems 242 and 262, such as color, contrast, and brightness characteristics of processed video signals, volume settings of the internal or external speakers 90 and 220, and connection to either an ISDN or POTS communication channel 82, for example.

In accordance with the system configuration illustrated in FIG. 7, a visual conferencing application software package is preferably operable on each of the local and host computer systems 244 and 264. The visual conferencing application software package preferably enhances and expands the functionality of the audio/visual communication systems 242 and 262 in a manner previously discussed and further discussed hereinafter. The local host computer 244, for example, preferably issues one or more coordination instructions to the local audio/visual communication system 242 to orchestrate the transfer of video data received from the communication channel 82 by the local audio/visual communication system 242 for presentation on the local display 248. Further, the local host computer 244, in cooperation with the visual conferencing application software operating on the local host computer 244, preferably issues one or more coordination instructions to effect the transfer of data files between the local audio/visual communication system 242 and the remote audio/visual communication system 262 and remote host computer system 264. It is to be understood that the features and functionality discussed with reference to the local audio/visual communication system 242 are equally applicable to the remote audio/visual communication system 262.

Another important feature provided by the cooperation of the local host computer 244 and the visual conferencing application software operating thereon, includes the capability to adjust or modify the effective transmission bandwidth of the communication channel 82 to enhance or degrade the relative transmission rates of audio, video, and data information transmitted over the communication channel 82. In one embodiment, the frequency bandwidth of the communication channel 82 allocated between video, audio, and data file sources is preferably modifiable by the host computer system 72 operating visual conferencing application software. The communication channel 82 transmission bandwidth is preferably adjustable in finite increments in compliance with the CCITT H.320 standards specification. Any of the video, audio, and data file sources may be degraded or eliminated in order to enhance the relative performance of the other sources. Adjustment of the communication channel 82 transmission bandwidth allocated for audio, video, and data signal transmission is preferably made within constraints imposed by the CCITT H.320 communication standard, or other internationally recognized standard, to ensure that full-motion video conferencing is maintained.

Another important feature realized through the cooperation of the local audio/visual communication system 242 and the local host computer system 242 and associated visual conferencing application software is the capability to simultaneously display on either one of the local and remote displays 248 and 268 video images transmitted from both the local and remote conferencing sites 240 and 260. The local audio/visual communication system 242, as later discussed in detail with reference to FIG. 8, receives and buffers both the local source video signal 254 and the remote source video signal 274, and produces a video signal representative of both local and remote video signals. The local host computer 244 then transmits the combined local and remote video signal for display on the local display 248.

Figure 13:
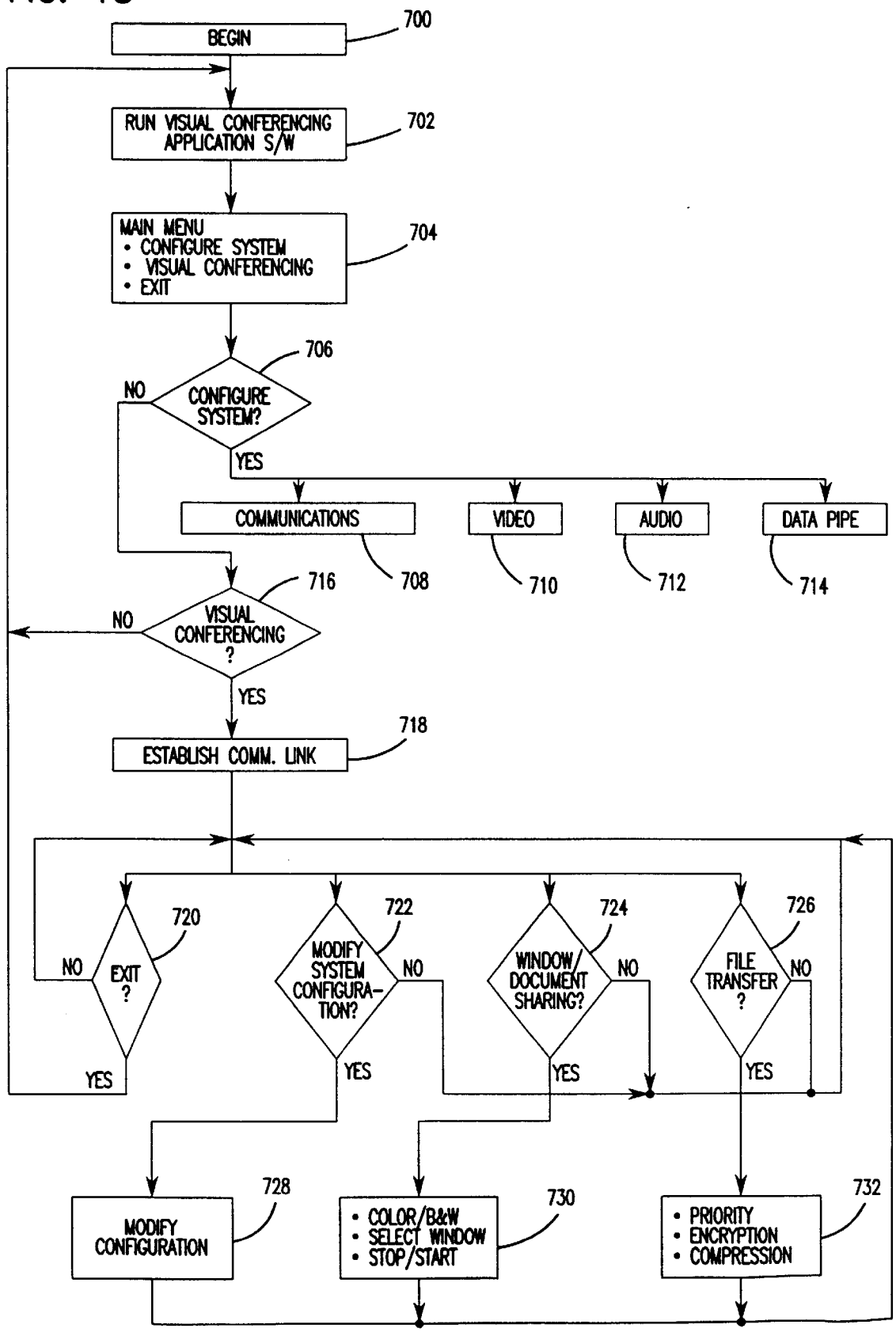
FIG. 13 is a generalized flow diagram illustrating various processing steps associated with the coordination of enhanced visual conferencing functions orchestrated by visual conferencing application software operating on a host computer system in cooperation with a novel peripheral audio/visual communication system.

A generalized flow diagram illustrating some of the more important coordination functions performed by the video conferencing application software is provided in FIG. 13. The video conferencing application software is preferably operated on both the local and remote host computer systems 244 and 264 to advantageously enhance the operation of the local and remote audio/visual communication systems 242 and 262. A conferencing party typically initiates video conferencing by executing the visual conferencing application software at step 702. The user is preferably presented with various options by the presentation of a main menu at step 704, including options to configure the system, initiate visual conferencing, and to terminate the visual conferencing session.

A conferencing party, at step 706, has the option to modify various parameters affecting the configuration and operation of the local audio/visual communication system 242 and the local host computer system 244. At step 708, a user may select and modify various parameters affecting the communication between the local audio/visual communication system 242 and the communication channel 82. The user, for example, may specify whether visual conferencing will be established over a standard analog (POTS) or digital (ISDN) communication channel 82. An automated phone book database, for example, may be established and accessed to assist a user when establishing a communication link with a conferencing party. Other communication features may be controlled at step 708, such as call logging which results in the recording of data associated with incoming, outgoing, or all communications made between the local audio/visual communication system 242 and the communication channel 82.

A conferencing party, at step 710, may select and modify various video features and settings affecting both the local monitor 281, coupled to the local audio/visual communication system 242, and the local display 248, coupled to the local host computer system 244. A user may, for example, selectably decide to view video images associated with a local source video signal 254 received from either a main or an auxiliary video source 152 or 154. A picture-in-picture display mode may be enabled or disabled as desired. The color, brightness, contrast, and tint characteristics of the local source video signal 254 may be adjusted, preferably through on-screen controls adjustable by a conferencing party via a local user interface 246. Further, the user may configure the local audio/visual communication system 242 at step 710 to display video images acquired from the local conferencing site, remote conferencing site, or both conferencing sites. Various configuration parameters affecting the local and remote audio may be modified at step 712. The gain of the audio input of a main camera or auxiliary camera, for example, may be modified by a conferencing party. The volume level of an internal or external speaker 90 and 220 may also be controlled.

The operational characteristics of the data pipe 82 and data transfer capability of the local audio/visual communication system 242 may be modified by a user at step 714. The transferring of data files over the communication channel 82 may, for example, be given a high priority relative to video and audio data transmission, resulting in the continuous transfer of data bytes comprising the data files over the communication channel 82. Alternatively, the data file transfer process may be given a lower priority, resulting in the selective transmission of data bytes in the background to ensure optimum transmission of video and audio data through the communication channel 82.

A conferencing party may initiate visual conferencing from the main menu at steps 704 and 716, and establish a communication link between the local conferencing site 240 and remote conferencing site 260 at step 718, typically by placing a call over the communication channel 82 to the remote conferencing site 260. During visual conferencing, a user has the option to modify the system configuration at step 722 and, at step 728, may modify various configuration and operational parameters discussed previously with respect to the configuration system option at step 706. A user may also modify the manner in which data files are transferred over the data pipe 82 at step 726, including, for example, options to modify the priority of data file transmission relative to video and audio signal transmission, and to encrypt and/or compress the data file prior to transmission. Visual conferencing between two conferencing sites 240 and 260 may continue until a conferencing party decides to terminate the video conferencing session, typically by exiting the visual conferencing software application at step 720 or from the main menu at step 704.

During a video conferencing session between a local and remote conferencing site 240 and 260, a conferencing party may wish to initiate window sharing or document collaboration at step 724. An option to share a window presented either in color or black and white is preferably provided to ensure reliable and continuous window sharing and/or document collaboration over a limited bandwidth communication channel 82. Conferencing parties, for example, may initially share a window presented in color, and subsequently switch to a black and white presentation at step 730 if a degradation in picture quality, typically resulting from a reduction in the rate of data transmission over the data pipe 82, is experienced. A user may select a particular window for sharing, or choose to stop or start window sharing or document collaboration as desired at step 730. The features and functions discussed hereinabove with regard to the video conferencing application software operating in cooperation with a host computer system are provided for illustrative purposes only, and exemplify the enhanced functionality of a local and remote audio/visual communication system 240 and 262 when respectively coupled to local and remote host computer systems 244 and 264.

Another important feature concerns a novel video conferencing software routine or application operable on either or both of the local and remote host computer systems 244 and 264 for monitoring incoming communications received over the communication channel 82. An incoming communication sensing software application, operable on the local host computer 244, for example, preferably monitors signal traffic over the local output interface 250. The sensing software routine preferably operates independently of any other application software operating on the local host computer 244, and is preferably both inaccessible to and imperceptible by a user of the local host computer 244. As such, the sensing software routine operates in the background and continuously monitors for incoming communications by polling the local output interface 250 on a regular basis, once every second, for example. Upon sensing an incoming communication, the sensing software routine preferably initiates or executes an alerting software application or routine which preferably alerts the user of the local audio/visual communication system 242 to the incoming communication received over the communication channel 82.

The alerting software routine preferably interrupts the current operation of the visual conferencing application software or any other application software currently operating on the local host computer 244, and presents the user with a plurality of options, including an option to answer or ignore the incoming communication. The local host computer 244, in response to a user's decision to answer the incoming communication, preferably issues an answer coordination instruction to the local audio/visual communication system 242, and executes a visual conferencing application software routine to receive and respond to the incoming communication.

The user of the local audio/visual communication system 242 preferably interfaces with the local host computer 244 through a local user interface 246 coupled to the local host computer system 244. The local user interface 246 is preferably a graphical user interface which, in cooperation with a mouse and keyboard coupled to the local host computer system 244, provides a user with means for communicating coordination instructions between the local host computer system 244 and the local audio/visual communication system 242. It is noted that graphical user interfaces, such as those developed for Windows® and Macintosh® based computer systems, are commonly used to control or operate a host computer system. Those skilled in the art may create new or modify existing graphical user interface programs to include functionality for controlling the operation of the local host computer 244 and, in cooperation with the visual conferencing application software, the local audio/visual communication system 242.

Figure 8:
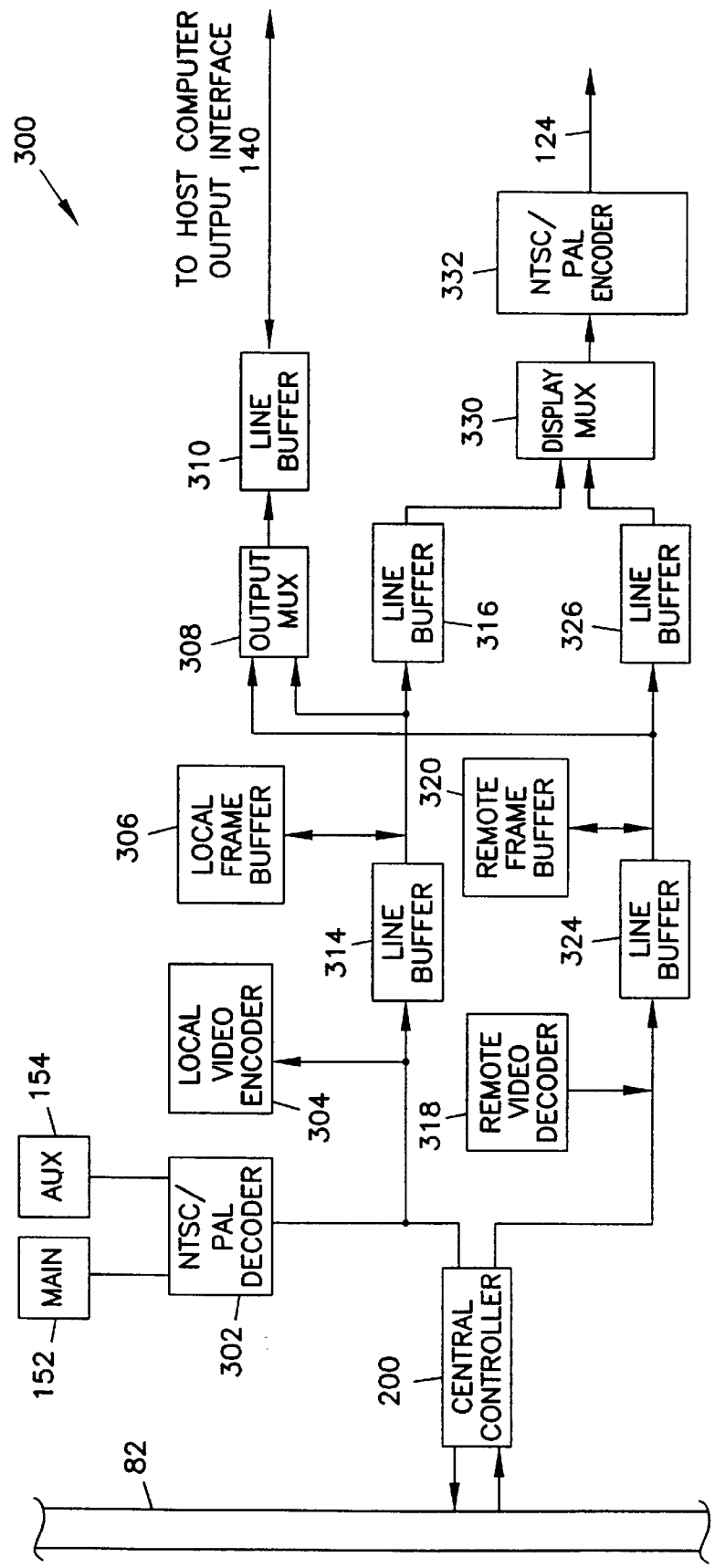
FIG. 8 is a block diagram of a video processing board suitable for processing local or remote video signals communicated to a novel peripheral audio/visual communication system.
Figure 9:
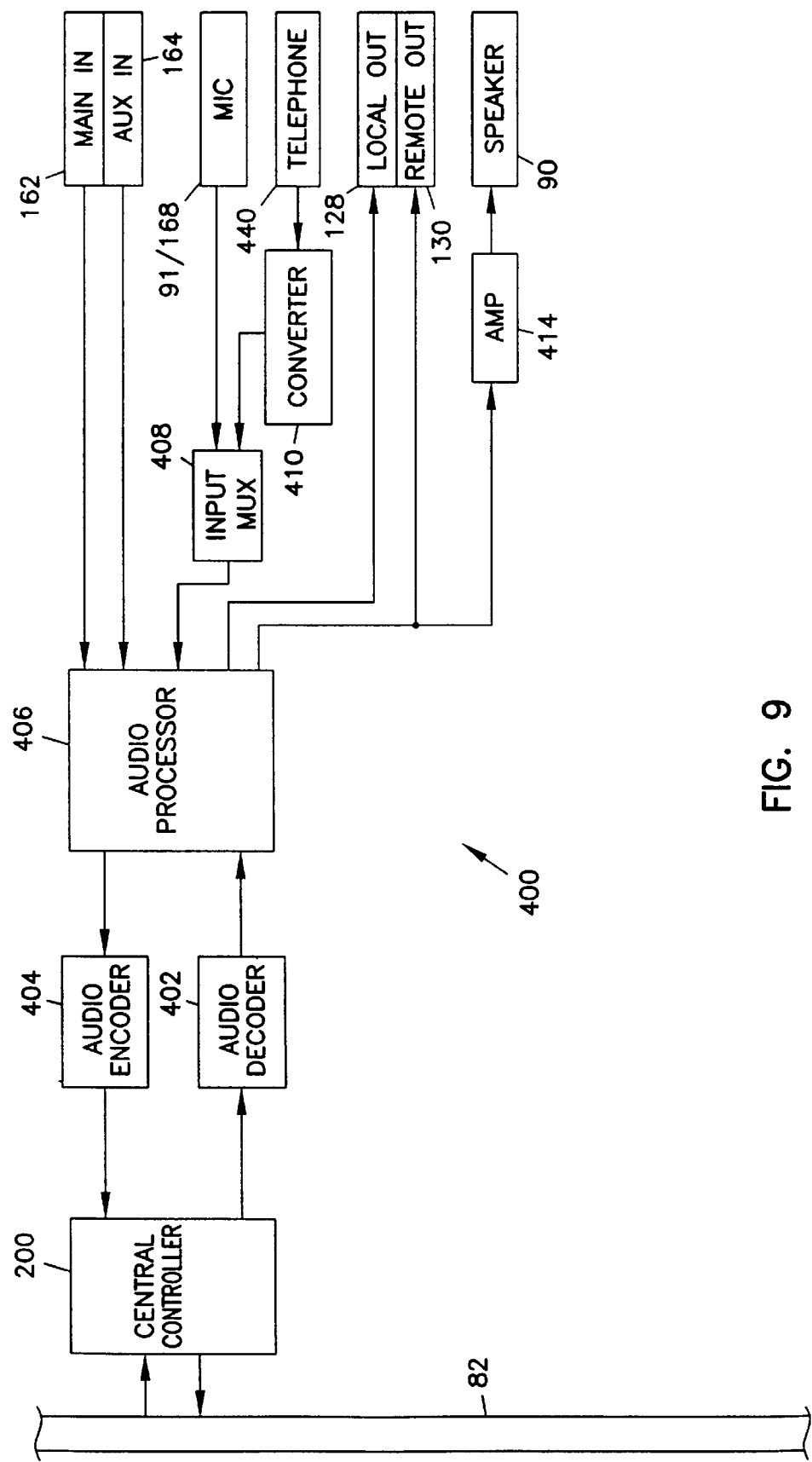
FIG. 9 is a block diagram of an audio processing board suitable for processing local and remote audio signals communicated to a novel peripheral audio/visual communication system.

FIGS. 8 and 9 illustrate in block diagram form the various audio and video processing components comprising the audio and video boards 102 and 104 illustrated in FIGS. 4 and 5. An important advantage of the video board 104 comprising the audio/visual communication system 72 concerns the automatic detection and processing of video signals produced by either an NTSC or a PAL video source. The video processing block diagram 300 shown in FIG. 8 includes a central controller 200 which coordinates transmission and reception of video signals communicated over the communication channel 82. Local video signals produced at the local conferencing site 240 by either an NTSC or a PAL video camera are preferably received by the main video input jack 152 and/or the auxiliary video input jack 154.

The NTSC standard prescribes a video frame rate of thirty video frames per second, while the PAL standard specifies a video frame rate of twenty-five video frames per second, to maintain full-motion video. A single frame of motion video typically comprises an even field and an odd field. The NTSC/PAL decoder 302 preferably converts a local NTSC or PAL video signal to corresponding local decoded video image or pixel data at the output of the NTSC/PAL decoder 302. Automatic detection and determination of the video signal format is performed by the NTSC/PAL decoder 302 as it processes the header information and other constituent data comprising a PAL and an NTSC video signal.

The decoded local video pixel data is typically of an RGB (Red, Blue, Green) or YUV (luminance Y, and color difference signals U and V) video format. The NTSC/PAL decoder 302 preferably decodes local NTSC video signals to corresponding CIF240 resolution image data (352×244), and local PAL video signals to corresponding CIF resolution image data (352×288). A CIF240 resolution image is recognized as a standard image format for domestic video display devices, while a CIF (and QCIF) resolution image is recognized as an international standard image format.

When processing an even field of a local NTSC or PAL video frame, the NTSC/PAL decoder 302 preferably transmits to the local video encoder 304 local CIF240 or CIF resolution image data depending on whether the local video source device is an NTSC or PAL camera. The local video encoder 304 preferably includes scaling circuitry that scales a local CIF240 resolution image to an appropriate CIF resolution image. When processing an odd field of the local NTSC or PAL video frame, the NTSC/PAL decoder 302 preferably transmits the previously decoded even field CIF image data or pixels to the local frame buffer 306 while simultaneously decoding the next odd field of the local video frame. This decoding scheme is preferably repeated for subsequent local NTSC or PAL video frames received by the NTSC/PAL decoder 302. The local video encoder 304 preferably comprises circuitry to convert local decoded video image data, typically in YUV format, to corresponding compressed local video image data. A suitable local video encoder 304 is model AV4310A manufactured by AT&T, and a suitable NTSC/PAL decoder 302 is model SAA7194 manufactured by Philips.

The local frame buffer 306 preferably comprises DRAM memory (Dynamic Random Access Memory) sufficient to temporarily store or buffer the data for 256,000 local pixels, which is sufficient to buffer two local CIF images. Thus, the local frame buffer 306 provides double buffering of the local CIF video image data which, together with the line buffer 314 disposed between the local video encoder 304 and the local frame buffer 306, enhances cooperation and processing between the NTSC/PAL decoder 302, local video encoder 304, and local frame buffer 306. The reconstructed local CIF image data buffered in the local frame buffer 306 may then be routed to one or both of the output interface 140 and/or the video output jack 124 as local decoded video signals. The local decoded video image data processed by the NTSC/PAL decoder 302 and local video encoder 304 is also preferably transmitted to the central controller 200 for communication over the communication channel 82.

Remote video image signals transmitted over the communication channel 82 are preferably received at the central controller 200 and transferred to a remote video decoder 318. The remote video signals are converted by the video decoder 318 to corresponding remote decoded video frame data. The reconstructed frame data is buffered in a line buffer 324 and temporarily stored in a remote frame buffer 320. In a manner similar to that previously described with respect to the NTSC/PAL decoder 302 and local video encoder 304, even and odd fields of the remote video frame data are successively decoded and reconstructed into remote decoded video frame data, and buffered by cooperative processing between the remote video decoder 318 and the remote frame buffer 320. The remote decoded video frame data is then routed to one or both of the output interface 140 and/or the video output jack 124 as remote decoded video signals.

Another important advantage provided by the audio/visual communication system 70 concerns the simultaneous displaying of decoded local and remote video images on a video monitor 76 or a display 74 coupled to a separate host computer 72. In one embodiment illustrated in FIG. 8, an output multiplexer 308 receives decoded local and remote video frame data respectively from the local frame buffer 306 and remote frame buffer 320. The combined decoded local and remote video frame data is buffered in a line buffer 310 for output to the separate host computer 72 over the host computer output interface 140. The line buffer 310 is provided preferably to enhance the transmission of the decoded local and remote video frame data between the output multiplexer 308 and the host computer output interface 140.

The combined local and remote video frame data may then be presented as various combinations of associated local and remote video images on the display 74 coupled to the host computer system 72. The host computer system 72 preferably issues one or more coordination instructions to control the routing of the decoded local and remote video image data between the host computer output interface 140 and the video output jack 124. The output multiplexer 308 may, for example, be instructed to transmit only the remote video frame data to the host computer output interface 140, rather than the local video frame data or the combined local and remote video frame data.

The decoded local and remote video frame data may also be routed to the video output jack 124 through the display multiplexer 330. The display multiplexer 330 preferably controls the video frame data transmitted to the NTSC/PAL encoder 332 and video output jack 124. Local, remote, or combined local and remote video frame data may be transmitted to the NTSC/PAL encoder 332 through the display multiplexer 330. The video frame data transmitted by the display multiplexer 330 are converted to an NTSC or PAL format by the NTSC/PAL encoder 332 for communication to the video output jack 124 for eventual display on an NTSC or PAL monitor 76 coupled thereto.

The NTSC/PAL encoder 332 is preferably configured to receive 704 pixels from the display multiplexer 330 corresponding to a CIF video image residing respectively in each of the local and remote frame buffers 306 and 320 (352 local pixels and 352 remote pixels provide 704 total pixels). If it is desirable to display only the local or remote video images on the monitor 76 coupled to the video output jack 124, the display multiplexer 330 preferably performs 1-to-2 upscaling (352×2) by latching and holding the 352 local or remote pixels prior to being transferred to the NTSC/PAL encoder 332. If side-by-side presentation of the local and remote video image is desirable, the display multiplexer 330 respectively transfers all 352 pixels from each of the local and remote frame buffers 306 and 320 to the NTSC/PAL encoder 332. A suitable display multiplexer 330 is model XC3030 manufactured by Xilink, and a suitable NTSC/PAL encoder 332 is model SAA179 manufactured by Philips.

Turning to FIG. 9, there is shown a block diagram of the various system components 400 that process local audio signals acquired from a local conferencing site and remote audio signals received over the communication channel 82. Local audio signals are preferably input to an audio processor 406 from a plurality of audio sources. Main and auxiliary input jacks 164 and 162 are respectively provided on the peripheral housing 115 of the audio/visual communication system 70 for receiving local audio signals typically from the audio outputs of a video camera or camcorder. The audio processor 406 may further receive local audio signals from an internal microphone 91, and external microphone coupled to the external microphone jack 168, or a standard telephone microphone 440 coupled to a converter 410 that converts the audio telephonic signal to an appropriate analog audio signal. In one configuration, an input multiplexer 408, with its output coupled to the audio processor 406, provides means for combining local audio signals produced by the microphone 91 and the telephone 440. The audio processor 406 preferably includes analog-to-digital converter for converting local analog audio signals to corresponding local digital audio signals.

The local audio signals received by the audio processor 406 are transmitted to and processed by the audio encoder 404. The audio encoder preferably comprises audio coding circuitry to convert local digital audio signals to corresponding local compressed audio signals. The local digital or compressed audio signals are then transmitted to the central controller 200 which coordinates transmission of the local audio signals over the communication channel 82. A suitable audio encoder 404 is model DSP3210 manufactured by AT&T.

Remote audio signals transmitted over the communication channel 82 are preferably received by the central controller 200 and transmitted to an audio decoder 402. The remote audio signals are typically serial compressed audio signals conforming to one of a number of industry standard compression formats. The audio decoder 402 preferably converts the remote compressed audio signals to corresponding remote digital audio signals. Additionally, the audio decoder 402 preferably comprises echo cancellation circuitry to filter out a local audio signal that is transmitted from a local conferencing site, received at a remote conferencing site, and then re-transmitted back to the local conferencing site and received again by the audio decoder 402.

The audio processor 406, preferably including a digital-to-analog converter, converts remote digital audio signals to corresponding remote analog audio signals for transmission to a plurality of audio outputs, including a local audio output jack 128, a remote audio output jack 130, an external speaker jack 132, and an amplifier 414 coupled to an internal speaker 90. A suitable audio decoder 402 is model DSP3210 manufactured by AT&T. It is noted that the central controller 200 cooperates with audio and video processing components 400 and 300 and the communication channel 82 to maintain optimum audio/visual communication system 70 operation.

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A video-conferencing system comprising:
   a video source signal generating device; and
   a stand-alone video conferencing module, the stand-alone video conferencing module comprises:
      a housing;
         a first receive unit that receives a local audio signal from the audio source signal generating device and a local video signal the video source signal generating device;
         a local transmission unit that transmits the local audio signal and the local video signal to a communication channel;
         a second receive unit that receives a remote audio signal and a remote video signal transmitted over the communication channel;
         an output interface, comprising an output connector, that communicates the remote video signal between the second receive unit and the output connector; and
         a control unit that controls the presentation of the remote video signal through the output connector and adjusts the transmission bandwidth of the communication channel;
      wherein the first receive unit, local transmission unit, second receive unit, and output interface are disposed in the housing.

2. The video-conferencing system of claim 1, further comprising:
   an audio source signal generating device;
   a video signal display device; and
   an audio signal output device.

3. The video-conferencing system according to claim 2, wherein the control unit is disposed in the housing.

4. The video-conferencing system according to claim 2, wherein the control unit is controlled by a user interface device.

5. The video-conferencing system according to claim 4, wherein the user interface device is separate from the housing.

6. The video-conferencing system according to claim 5, wherein the user interface device is selected from the group consisting essentially of a separate host computer, a telephone, a numeric keyboard, and a mouse.

7. The video-conferencing system according to claim 2, wherein the control unit displays a video image associated with the remote video signal within a video window displayed on the display device.

8. The video-conferencing system according to claim 7, wherein the control unit modifies the size of the video window displayed on the video signal display device.

9. The video-conferencing system according to claim 8, wherein the system further comprises software that cooperates with the control unit to display a video image associated with the remote video signal within a video window displayed on the video signal display device; and modifies the size of the video window displayed on the video signal display device.

10. The video-conferencing system according to claim 8, wherein the control unit is adapted to simultaneously display on the video signal display device video images associated with the remote and local video signals.

11. The video-conferencing system according to claim 10, wherein the system further comprises software that cooperates with the control unit to simultaneously display on the video signal display device video images associated with the remote and local video signals.

12. The video-conferencing system according to claim 2, wherein the control unit coordinates communication of the remote video signal between the second receive unit and the output interface.

13. The video-conferencing system according to claim 12, wherein the system further comprises software that cooperates with the control unit for coordinating communication of the remote video signal between the second receive unit and the output interface.

14. The video-conferencing system according to claim 2, wherein the system further comprises software that cooperates with the control unit to adjust the transmission bandwidth of the communication channel.

15. The video-conferencing system according to claim 2, wherein the video signal display device is a television.

16. The video-conferencing system according to claim 1, wherein the video signal display device is a video monitor.

17. The video-conferencing system according to claim 16, wherein the video monitor is coupled to a host computer.

18. The video-conferencing system according to claim 2, wherein the video signal display device is arranged and configured to receive an analog signal.

19. The video-conferencing system according to claim 2, wherein the video signal display device is arranged and configured to receive a digital signal.

20. The video-conferencing system according to claim 2, wherein the control unit is a separate host computer.

21. The video-conferencing system according to claim 2, wherein the first receive unit is adapted to receive the local video signal in one of a plurality of predetermined video formats.

22. The video-conferencing system according to claim 2, wherein the first receive unit is adapted to receive the local audio signal from a microphone and the local video signal from at least one of a video camera and a video media player.

23. The video-conferencing system according to claim 2, further comprising a channel selection device for selectably transmitting the local audio signal or local video signal over the communication channel.

24. The video-conferencing system according to claim 2, wherein the communication channel can be either an analog communication channel or a digital communication channel.

25. The video-conferencing system according to claim 2, wherein the local transmission unit comprises a data file processor that transmits a data file over the communication channel.

26. The video-conferencing system according to claim 25, wherein:
the local transmission unit converts a standard data file to a coded data file of a predetermined format; and
the first receive unit converts a coded data file of a predetermined format to a standard data file.

27. The video-conferencing system according to claim 2, further comprising a detection device that detects an incoming communication.

28. The video-conferencing system according to claim 27, wherein the control unit produces a detection signal in response to the detection device detecting an incoming communication.

29. The video-conferencing system according to claim 28, wherein the control unit generates an alert message displayed on the video signal display device in response to the detection signal.

30. The video-conferencing system according to claim 2, further comprising video conferencing software.

31. The video-conferencing system according to claim 2, wherein the video conferencing software operates on a separate host computer system.

32. The video-conferencing system according to claim 2, wherein the local transmission unit converts the local video signal in at least one of an NTSC format and a PAL format to an associated coded local video signal.

33. The video-conferencing system according to claim 2, wherein the audio signal output device is a plurality of audio speakers.

34. The video-conferencing system according to claim 2, wherein the audio signal output device is an audio amplifier coupled to a plurality of speakers.

35. The video-conferencing system according to claim 34, wherein the audio amplifier is controlled by the control unit.

36. The video-conferencing system according to claim 2, wherein the audio source signal generating device is a plurality of audio microphones.

37. The video-conferencing system according to claim 2, wherein the audio source signal generating device is an audio input amplifier/multiplexer coupled to a plurality of audio microphones.

38. The video-conferencing system according to claim 2, wherein the audio input amplifier/multiplexer is controlled by the control unit.

39. The video-conferencing system according to claim 2, wherein the video source signal generating device is a video camera.

40. The video-conferencing system according to claim 2, wherein the video source signal generating device is a video camcorder.

41. The video-conferencing system according to claim 2, wherein the video source signal generating device part of a video camcorder and the video source signal generating device is also part of the video camcorder.

* * * * *